(12) United States Patent
Shiino et al.

(10) Patent No.: US 7,412,954 B2
(45) Date of Patent: Aug. 19, 2008

(54) START-UP CONTROL FOR INTERNAL COMBUSTION ENGINE

(75) Inventors: Toshikazu Shiino, Chigasaki (JP); Hiroyuki Suzuki, Yokosuka (JP); Tomohiko Tatara, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 0 days.

(21) Appl. No.: 11/730,852

(22) Filed: Apr. 4, 2007

(65) Prior Publication Data

US 2007/0234990 A1 Oct. 11, 2007

(30) Foreign Application Priority Data

Apr. 5, 2006 (JP) ............... 2006-104497

(51) Int. Cl.
*F02N 17/00* (2006.01)
*F01L 13/08* (2006.01)
(52) U.S. Cl. ............... 123/179.16; 123/182.1
(58) Field of Classification Search ........... 123/179.1, 123/179.3, 179.16, 182.1, 316; 701/103, 701/104
See application file for complete search history.

(56) References Cited

U.S. PATENT DOCUMENTS

| | | | | |
|---|---|---|---|---|
| 5,187,935 A | * | 2/1993 | Akiyama et al. | 60/602 |
| 5,715,794 A | * | 2/1998 | Nakamura et al. | 123/305 |
| 5,724,863 A | * | 3/1998 | Kramer et al. | 74/583 |
| 6,761,147 B2 | * | 7/2004 | Majima | 123/399 |
| 7,117,827 B1 | * | 10/2006 | Hinderks | 123/43 R |
| 7,255,089 B2 | * | 8/2007 | Etou et al. | 123/406.29 |
| 2006/0081207 A1 | * | 4/2006 | Nakamura | 123/179.3 |

FOREIGN PATENT DOCUMENTS

JP 2001-123857 A 5/2001

* cited by examiner

*Primary Examiner*—John T Kwon
(74) *Attorney, Agent, or Firm*—Foley & Lardner LLP

(57) ABSTRACT

An internal combustion engine (101, 601, 901) alters an effective compression ratio from an effective compression ratio for a start-up operation to a larger effective compression ratio for a normal operation when an engine rotation speed (NE) increases beyond a resonance rotation speed region during cranking. A controller (104, 610, 910) determines whether or not the engine (101, 601, 901) has reached a combustion possible state on the basis of the engine rotation speed (NE) during cranking and an operating parameter (PA, TA, TW, P_Rail, V_Ang) other than the engine rotation speed (NE) (S1102, S1202, S1204). When the determination is negative, the controller (104, 610, 910) inhibits fuel supply to the engine (101, 601, 901) by a fuel supply device (207), even when the engine rotation speed has increased beyond the resonance rotation speed region (S406). In so doing, a combustion defect such as a misfire is prevented.

13 Claims, 23 Drawing Sheets

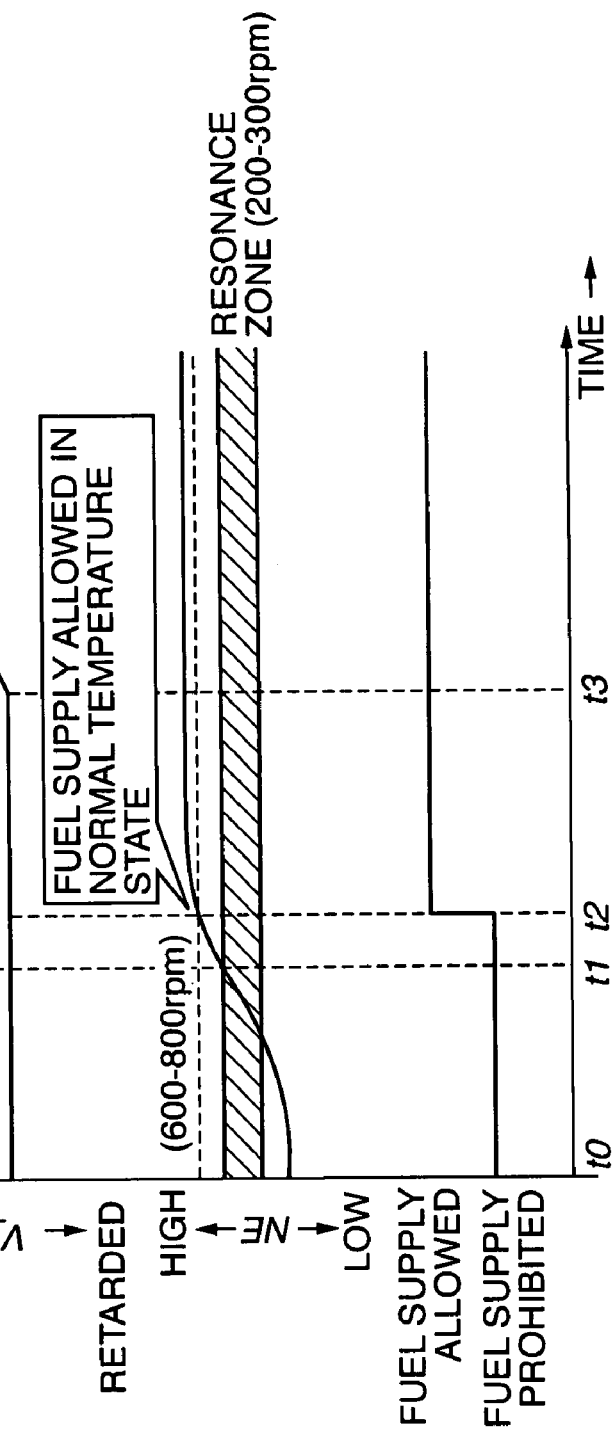

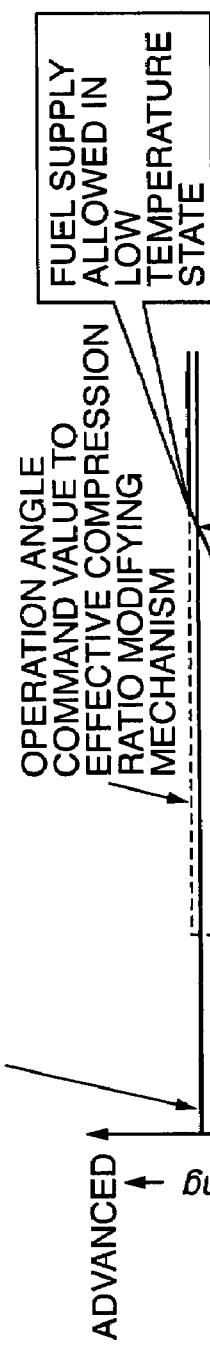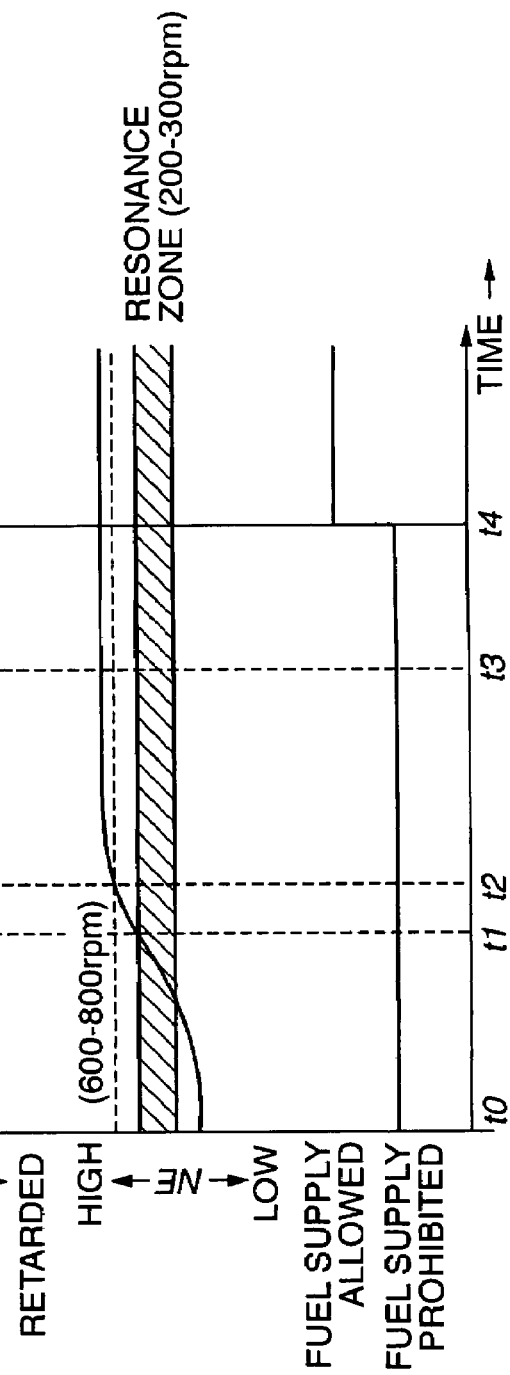

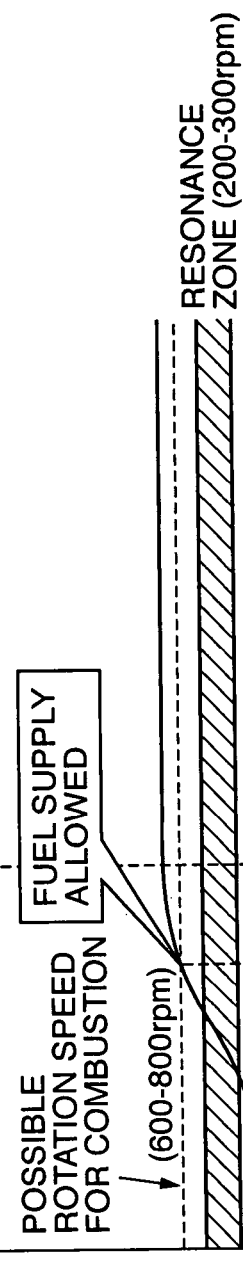

FIG. 25A

ADVANCED ↔ V_Ang ↔ RETARDED

POSSIBLE EFFECTIVE COMPRESSION RATIO FOR COMBUSTION IN LOW TEMPERATURE

FUEL SUPPLY ALLOWED

FIG. 25B

HIGH ↔ NE ↔ LOW

RESONANCE ZONE (200-300rpm)

600-800rpm

FIG. 25C

LARGE ↔ CRANKING TORQUE ↔ SMALL

TT_Mhigh
T_MSt
T_MSt0 t0   t1   t2 T_St0   t3   T_St   TIME →

START-UP CONTROL FOR INTERNAL COMBUSTION ENGINE

FIELD OF THE INVENTION

This invention relates to start-up control of a variable effective compression ratio internal combustion engine, based on a resonance rotation speed.

BACKGROUND OF THE INVENTION

An internal combustion engine for a vehicle has a specific resonance rotation speed region that is dependent on an engine mount and a drive system damper.

JP2001-123857A, published by the Japan Patent Office in 2001, proposes a variable effective compression ratio internal combustion engine for a vehicle in which the variable compression ratio of the internal combustion engine is suppressed to be small in the resonance rotation speed region.

In this prior art, when the rotation speed is within the resonance rotation speed range during start-up of the internal combustion engine, torque variation is reduced by suppressing the effective compression ratio of the internal combustion engine to be small. By reducing torque variation during start-up, the amplitude of torsional vibration in a crankshaft of the internal combustion engine and vibration in a main body of the internal combustion engine is reduced.

When the rotation speed of the internal combustion engine increases beyond the resonance rotation speed range in this prior art, the effective compression ratio is increased to an effective compression ratio for a normal operation and combustion is begun in the internal combustion engine.

SUMMARY OF THE INVENTION

In an internal combustion engine which modifies the effective compression ratio by adjusting a valve timing of an intake valve, the effective compression ratio is reduced by retarding the valve opening timing, and the effective compression ratio is increased to the effective compression ratio for a normal operation by returning the valve opening timing to a normal position from the retarded position.

In this type of internal combustion engine, a response delay occurs when modifying the valve opening timing from the retarded position to the normal position, and as a result, the effective compression ratio may not increase for a while even when the engine rotation speed increases beyond the resonance rotation speed range during start-up of the internal combustion engine.

However, if fuel injection is begun while the effective compression ratio remains small, a combustion defect such as a misfire may occur. At low temperatures or high altitudes where the air pressure is low, a misfire is particularly likely to occur when fuel injection is performed at a small effective compression ratio.

It is therefore an object of this invention to prevent the occurrence of a combustion defect in an internal combustion engine which controls an effective combustion ratio during start-up on the basis of a resonance rotation speed.

In order to achieve the above object, this invention provides a start-up control device for an internal combustion engine, comprising, a device which supplies a fuel to the internal combustion engine, a starter motor which cranks the internal combustion engine, a sensor which detects an engine rotation speed of the internal combustion engine, a sensor which detects an operating parameter other than the engine rotation speed of the internal combustion engine, an effective compression ratio modifying mechanism which alters an effective compression ratio of the internal combustion engine from an effective compression ratio for a start-up operation to a larger effective compression ratio for a normal operation when the engine rotation speed increases beyond a resonance rotation speed region during cranking, and a programmable controller programmed to control the fuel supply device.

The controller is programmed to determine whether or not the internal combustion engine has reached a combustion possible state on the basis of the engine rotation speed during cranking and the operating parameter other than the engine rotation speed, and inhibit fuel supply by the fuel supply device when the internal combustion engine has not reached the combustion possible state, even when the engine rotation speed has increased beyond the resonance rotation speed region.

This invention also provides a start-up control method for the internal combustion engine, comprising detecting an operating parameter other than the engine rotation speed of the internal combustion engine, determining whether or not the internal combustion engine has reached a combustion possible state on the basis of the engine rotation speed during cranking and the operating parameter other than the engine rotation speed, and inhibiting fuel supply by the fuel supplying device when the internal combustion engine has not reached the combustion possible state, even when the engine rotation speed has increased beyond the resonance rotation speed region.

The details as well as other features and advantages of this invention are set forth in the remainder of the specification and are shown in the accompanying drawings.

BRIEF DESCRIPTION OF THE DRAWINGS

FIGS. 12A-12C are timing charts illustrating a start-up condition of the internal combustion engine under start-up control according to the second embodiment of this invention.

FIGS. 14A-14C are similar to FIGS. 12A-12C, but show a condition when an intake air temperature is low.

FIGS. 24A-24C are timing charts illustrating a start-up condition of the internal combustion engine under the start-up control according to the third embodiment of this invention.

FIGS. 25A-25C are similar to FIGS. 24A-24C, but show a condition during cold start-up of the internal combustion engine.

DESCRIPTION OF THE PREFERRED EMBODIMENTS

Figure 1:
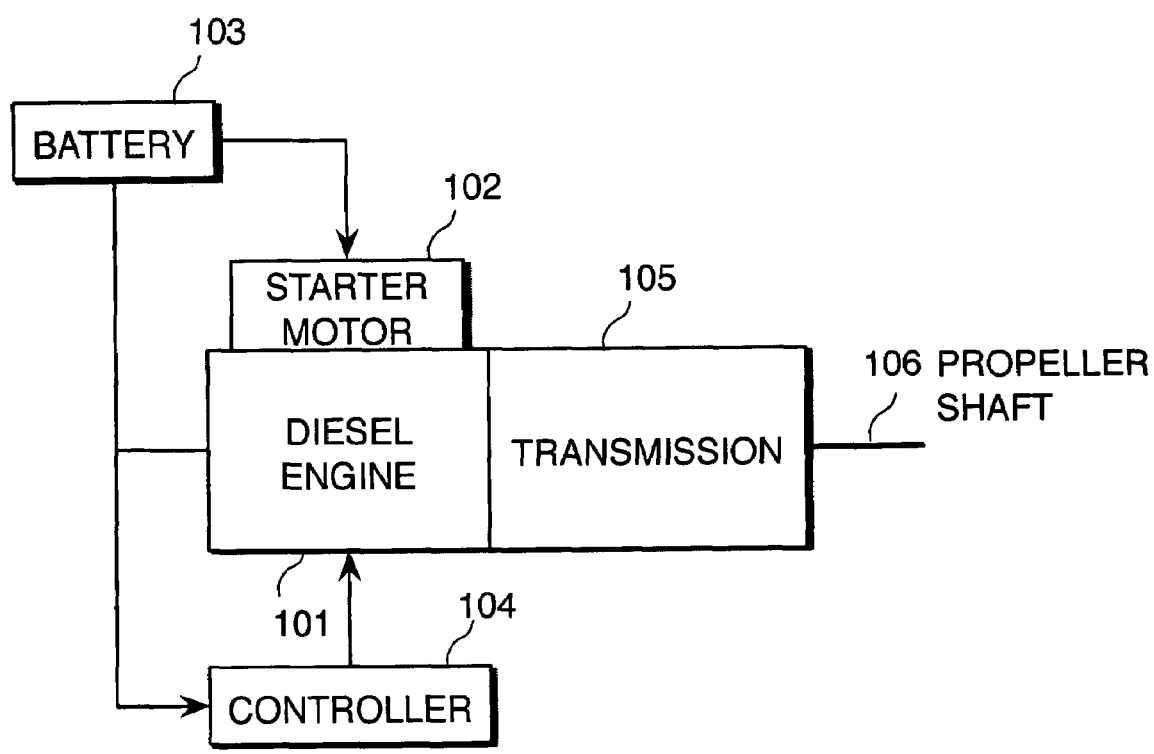
FIG. 1 is a schematic diagram of a start-up control device for an internal combustion engine according to this invention.

Referring to FIG. 1 of the drawings, an internal combustion engine 101 for performing diesel combustion is joined to a starter motor 102. The starter motor 102 drives the internal combustion engine 101 to rotate under a power supply from a battery 103 to start the internal combustion engine 101.

The capacity of the starter motor 102 is large enough to crank the internal combustion engine 101 to a higher rotation speed region than a resonance rotation speed region of the internal combustion engine 101, which is dependent on an engine mount and a drive system damper.

A rotary output of the internal combustion engine 101 is output to a propeller shaft 106 via a transmission 105. The transmission 105 modifies the output rotation speed and output torque of the internal combustion engine 101, and outputs the modified output rotation speed and output torque to the propeller shaft 106.

Figure 2:
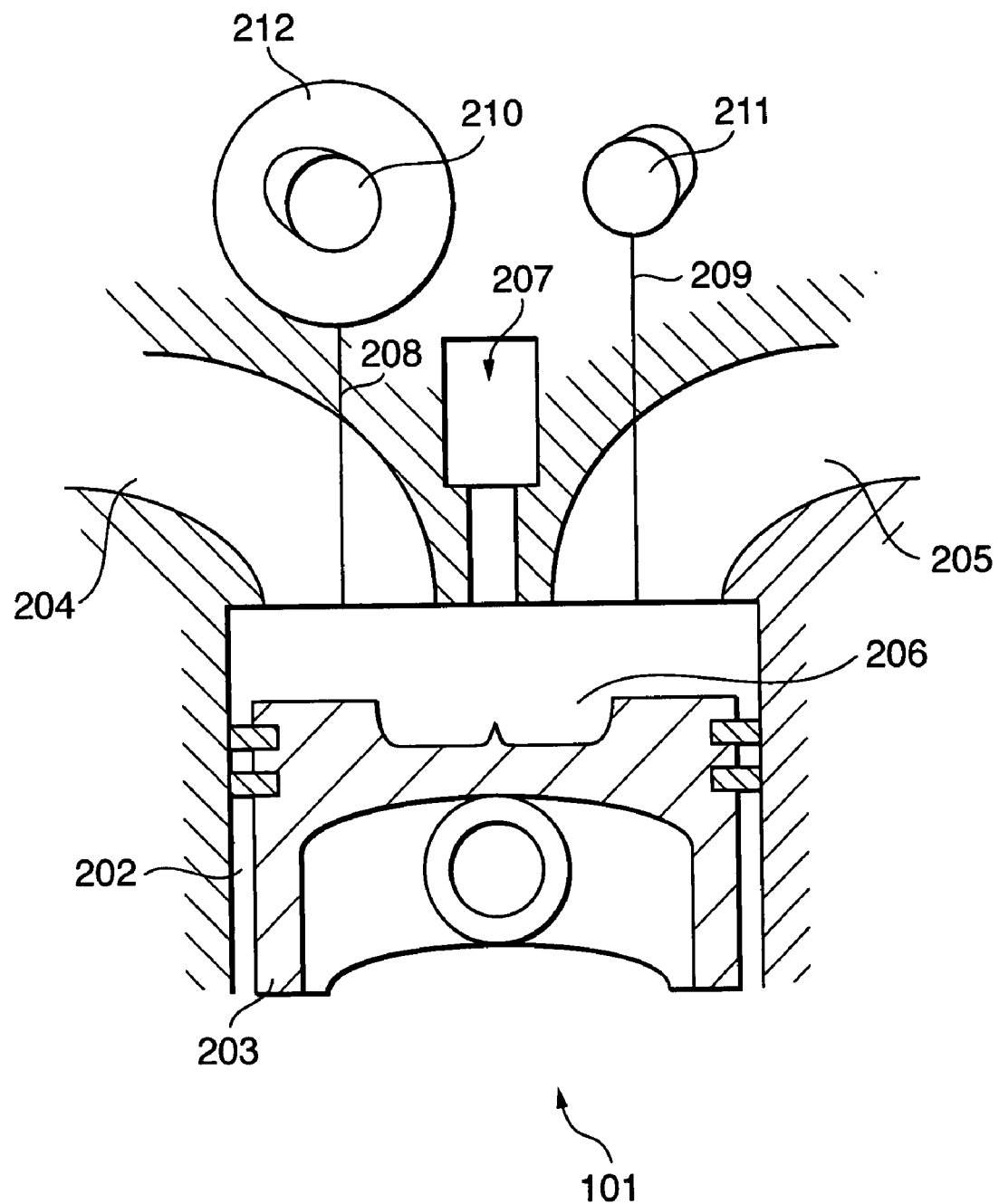
FIG. 2 is a schematic diagram of the internal combustion engine.

Referring to FIG. 2, the internal combustion engine 101 comprises a cylinder 202, a piston 203, an intake passage 204, and an exhaust passage 205.

A combustion chamber 206 is defined by the piston 203 in the interior of the cylinder 202. The internal combustion engine 101 comprises a fuel injector 207 serving as a fuel supply device for injecting fuel directly into the combustion chamber 206, and an intake valve 208 and an exhaust valve 209 for opening and closing the combustion chamber 206.

The intake valve 208 is driven to open and close by an intake cam 210, whereby the intake passage 204 is connected to or separated from the combustion chamber 206. The exhaust valve 209 is driven to open and close by an exhaust cam 211, whereby the exhaust passage 205 is connected to or separated from the combustion chamber 206.

The internal combustion engine 101 comprises an effective compression ratio modifying mechanism 212. The effective compression ratio modifying mechanism 212 varies the open/close timing of the intake valve 208 by varying the rotary phase of the intake cam 210 using an actuator such as a hydraulic solenoid or electromagnetic solenoid. By varying the open/close timing of the intake valve 208, the amount of air aspirated into the combustion chamber 206 during an intake stroke of the piston 203 varies, and as a result, the effective compression ratio varies.

It should be noted that modification of the effective compression ratio through the intake valve 208 may be realized by modifying the open valve period or the valve lift as well as modifying the valve open/close timing.

Figure 3:
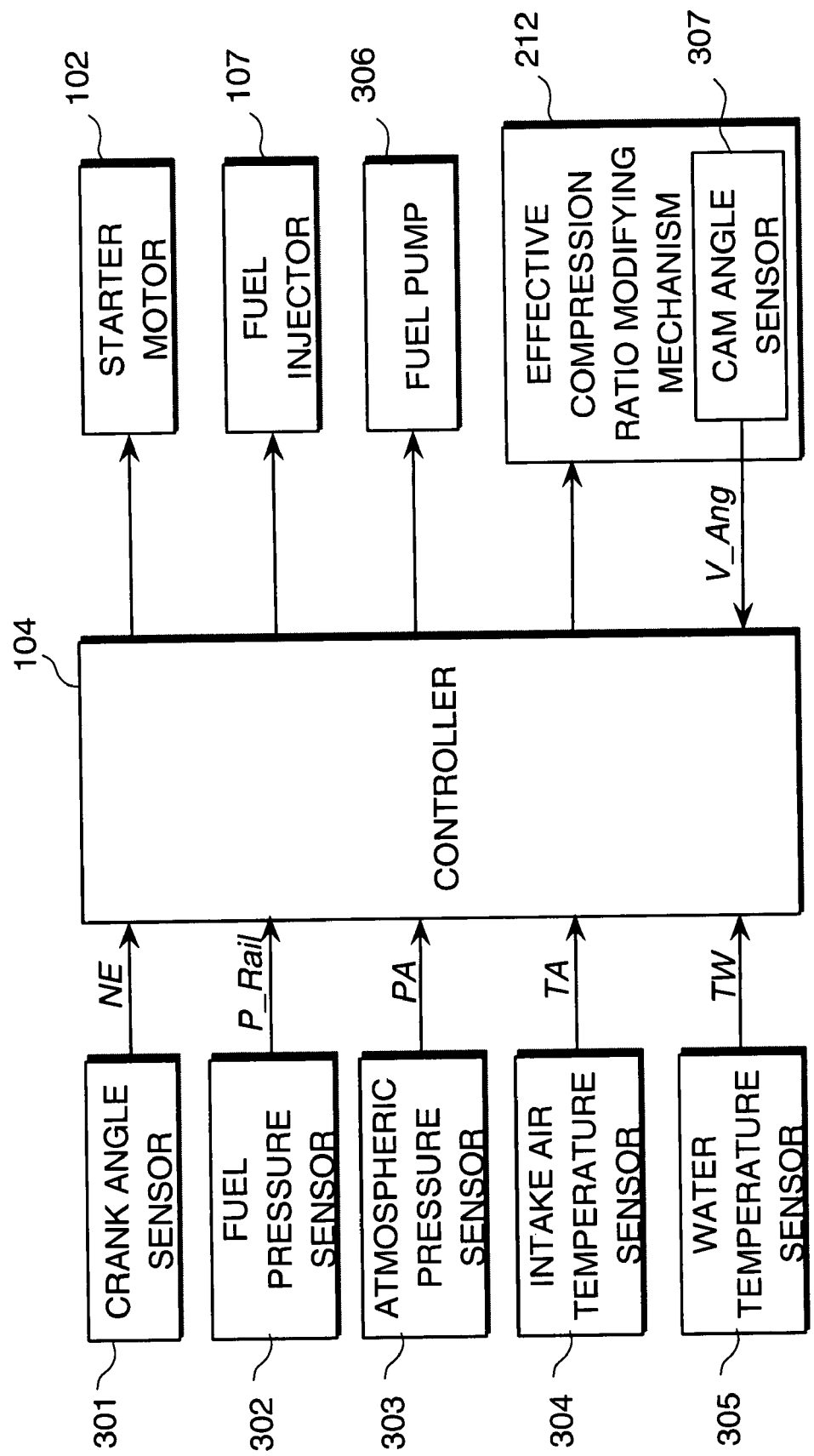
FIG. 3 is a block diagram illustrating input/output signals of a controller according to this invention.

A controller 104 shown in FIGS. 1 and 3 controls driving of the starter motor 102, fuel injection by the fuel injector 207, an operation of a fuel pump 306 that pressurizes the fuel injected by the fuel injector 207, and the open/close timing of the intake valve 208 via the effective compression ratio modifying mechanism 212.

The controller 104 is constituted by a microcomputer comprising a central processing unit (CPU), read-only memory (ROM), random access memory (RAM), and an input/output interface (I/O interface). The controller may be constituted by a plurality of microcomputers.

For the purposes of this control, an engine rotation speed NE from a crank angle sensor 301 that detects a crank angle of the internal combustion engine 101, a fuel pressure P_Rail from a fuel pressure sensor 302, an atmospheric pressure PA from an atmospheric pressure sensor 303, an intake air temperature TA from an intake air temperature sensor 304, a cooling water temperature TW from a water temperature sensor 305, and an effective compression ratio modifying mechanism operating angle V_Ang from a cam angle sensor 307 annexed to the effective compression ratio modifying mechanism 212 are input respectively into the controller 104 as signals.

A feature of this invention can be found in fuel injection control, which is performed during start-up of the internal combustion engine 101 as a part of the above control performed by the controller 104.

Briefly, in this control the controller 104 determines whether or not combustion can be performed without causing a combustion defect such as a misfire when the engine rotation speed NE increases from the start of cranking so as to exceed the resonance rotation speed region, and either permits or prohibits injection by the fuel injector 207 in accordance with the result of the determination.

More specifically, the controller 104 outputs a cranking start command to the starter motor 102 in response to a start signal from a start switch provided integrally with a key switch in a vehicle cabin or a start signal for restarting the internal combustion engine 101 automatically during idling-stop control. Upon reception of the cranking start command, the starter motor 102 begins cranking the internal combustion engine 101. As cranking continues, the engine rotation speed NE of the internal combustion engine 101 rises. Eventually, the engine rotation speed NE enters a higher region than the resonance rotation speed region that is dependent on the engine mount and drive system damper. The resonance rotation speed region corresponds to for example a range of 200-300 rpm.

To suppress vibration of the internal combustion engine 101 in the resonance rotation speed region, the controller 104 suppresses variation in the rotary torque of the internal combustion engine 101 in the resonance rotation speed region by maintaining the effective compression ratio of the internal combustion engine 101 at a start-up effective compression ratio, which is smaller than an effective compression ratio for combustion on the outside of the resonance rotation speed region, via the effective compression ratio modifying mechanism 212.

Once the engine rotation speed NE has risen beyond the resonance rotation speed region, the controller 104 adjusts the valve open/close timing of the intake valve 208 via the effective compression ratio modifying mechanism 212 to raise the effective compression ratio from the start-up effective compression ratio to the effective compression ratio for combustion.

Here, when the fuel injector 207 is caused to begin fuel injection on the single condition that the rotation speed of the internal combustion engine 101 rise beyond the resonance rotation speed region, an operation delay occurs in the effective compression ratio modifying mechanism 212, and as a result, combustion may start while the effective compression ratio of the internal combustion engine 101 is still small. In this case, a combustion defect such as a misfire may occur. This type of combustion defect leads to deterioration of the exhaust gas composition.

Hence, in this invention, the controller 104 detects at least one of the fuel pressure, the atmospheric pressure PA, the intake air temperature TA, the engine cooling water temperature TW, and the effective compression ratio modifying mechanism operating angle V_Ang as a quantity of state that contributes to combustion in addition to the engine rotation speed NE.

On the basis of the detected quantity of state that contributes to combustion, the controller 104 performs a combustion possibility determination to determine whether or not the internal combustion engine 101 can perform combustion without causing a combustion defect such as a misfire. A combustion defect is prevented by allowing the fuel injector 207 to begin fuel injection only when the controller 104 determines that combustion is possible.

Figure 4:
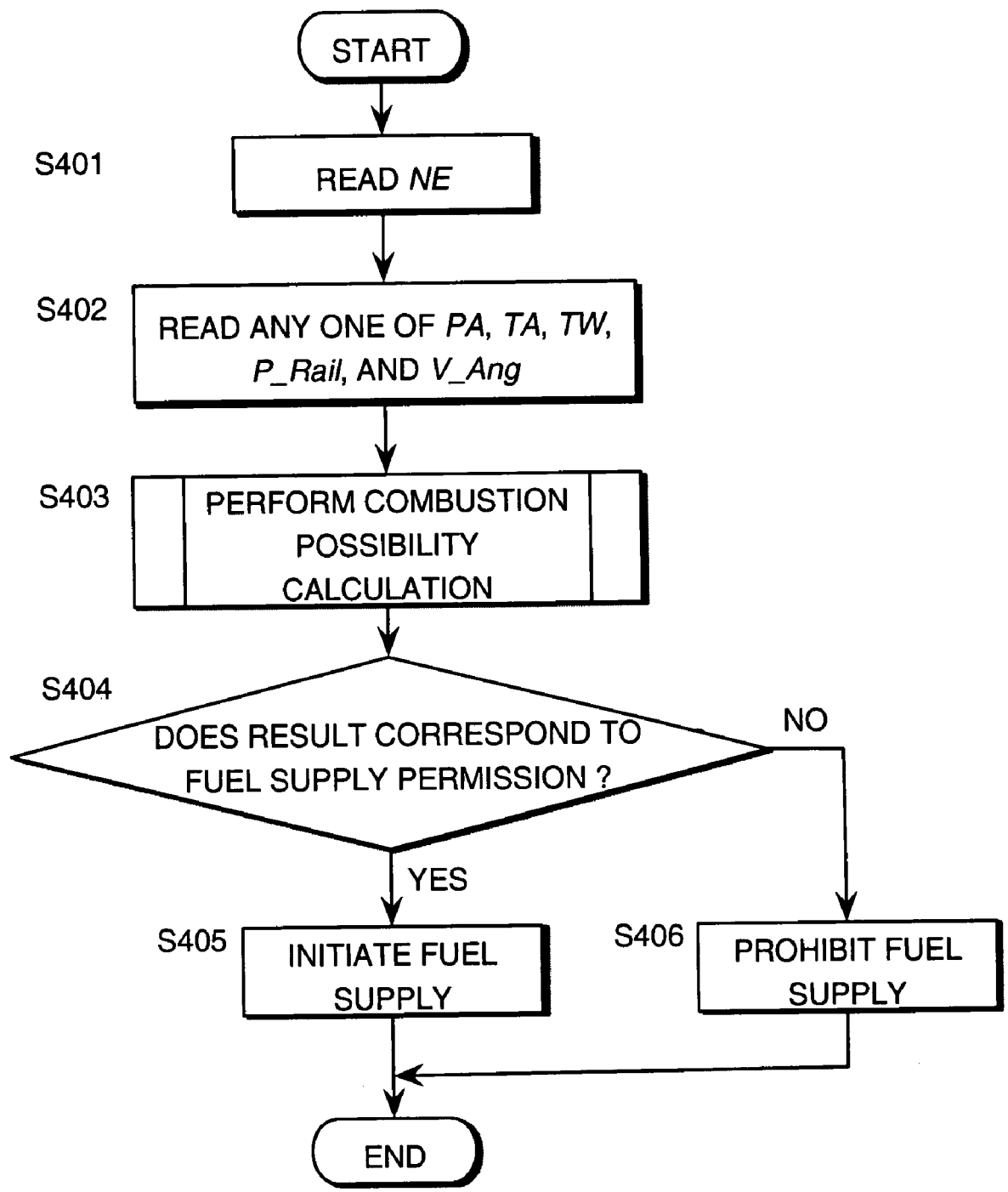
FIG. 4 is a flowchart illustrating a fuel injection start determination routine executed by the controller.

Referring to FIG. 4, a fuel injection start determination routine executed by the controller 104 for the purpose of this control will be described.

The controller 104 executes this routine repeatedly at ten millisecond intervals or upon each revolution of a crankshaft, for example, during a period extending from a start-up operation of the internal combustion engine 101, or in other words the start of cranking of the internal combustion engine 101 by the starter motor 102, to complete combustion in the internal combustion engine 101.

First, in a step S401, the controller 104 reads the engine rotation speed NE.

In a step S402, the controller 104 reads one of the atmospheric pressure PA, the intake air temperature TA, the engine cooling water temperature TW, the fuel pressure P_Rail, and the effective compression ratio modifying mechanism operating angle V_Ang.

Figure 5:
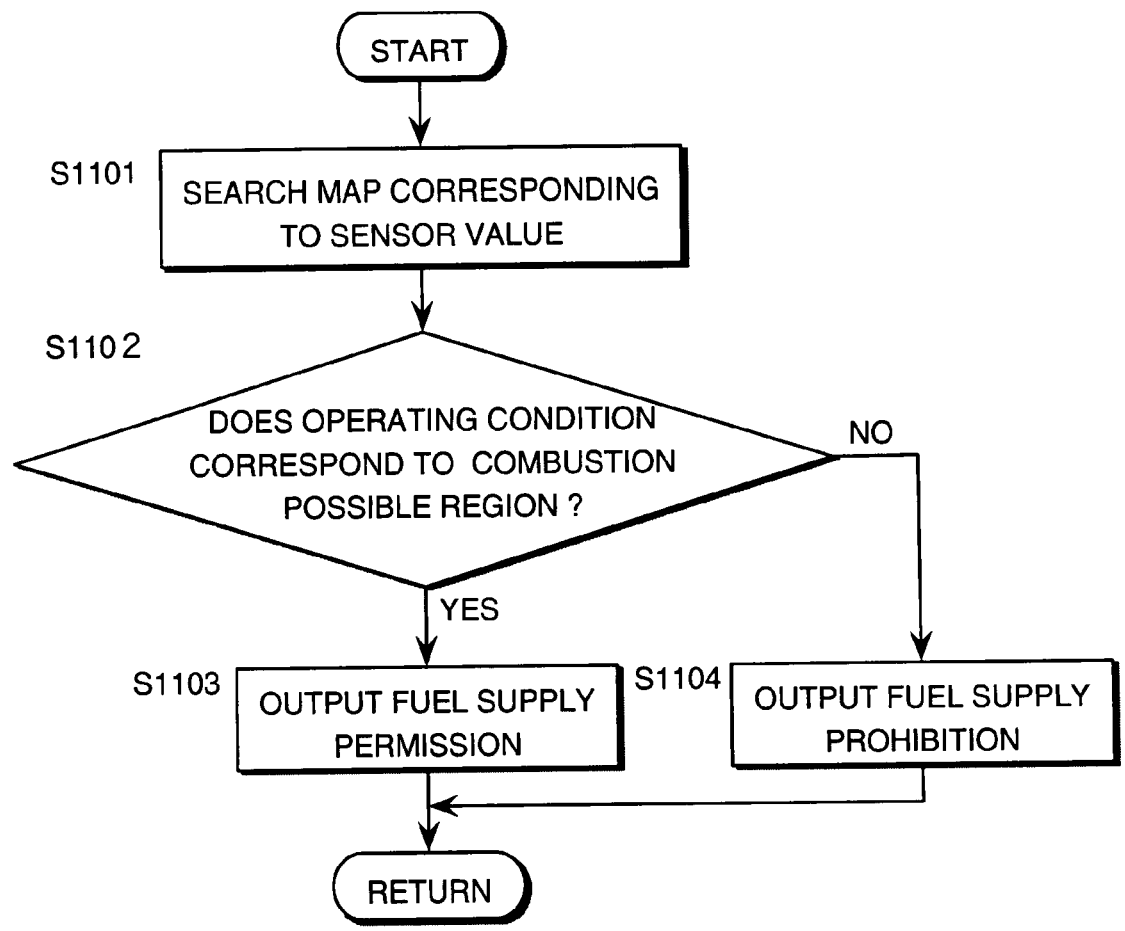
FIG. 5 is a flowchart illustrating a combustion possibility determination subroutine executed by the controller.

In a step S403, the controller 104 performs a calculation relating to the possibility of combustion on the basis of the engine rotation speed NE read in the step S401 and the sensor value read in the step S402, using a subroutine shown in FIG. 5.

In a step S404, the controller 104 determines whether or not the calculation result of the step S403 corresponds to fuel supply permission.

When the calculation result of the step S403 corresponds to fuel supply permission, the controller 104 initiates fuel supply to the fuel injector 207 in a step S405. Following the processing of the step S405, the controller 104 terminates the routine.

On the other hand, when the calculation result of the step S403 does not correspond to fuel supply permission, the controller 104 prohibits fuel supply to the fuel injector 207 in a step S406. As a result, cranking by the starter motor 102 is continued without supplying fuel to the combustion chamber 206. Following the processing of the step S406, the controller 104 terminates the routine.

Next, referring to FIG. 5, a combustion possibility determination subroutine, executed by the controller 104 in the step S403, will be described.

First, in a step S1101, the controller 104 accesses a region determination map stored in the ROM in advance and having the characteristics shown in FIGS. 6A-6E from the engine rotation speed NE read in the step S401 of the routine shown in FIG. 4 and the sensor value read in the step S402, i.e. any one of the atmospheric pressure PA, the intake air temperature TA, the engine cooling water temperature TW, the fuel pressure P_Rail, and the effective compression ratio modifying mechanism operating angle V_Ang. Here, the region determination map accessed from the ROM is one type of map corresponding to the read sensor values.

In a step S1102, the controller 104 searches the region determination map corresponding to the two read parameters, and determines whether the operating condition of the internal combustion engine 101 corresponds to a combustion possible region in the map or a combustion impossible region in the map.

When the operating condition of the internal combustion engine 101 corresponds to the combustion possible region, the controller 104 outputs a fuel supply permission command in a step S1103, and then terminates the subroutine.

When the operating condition of the internal combustion engine 101 corresponds to the combustion impossible region, the controller 104 outputs a fuel supply prohibition command in a step S1104, and then terminates the subroutine.

Referring to FIGS. 6A-6E, the characteristics of the region determination maps accessed by the controller 104 in the step S1101 will be described.

The combustion possible region and the combustion impossible region are set in these region determination maps in accordance with the engine rotation speed NE and one parameter from among the effective compression ratio modifying mechanism operating angle V_Ang, the atmospheric pressure PA, the engine cooling water temperature TW, the fuel pressure P_Rail, and the intake air temperature TA.

Figure 6A:
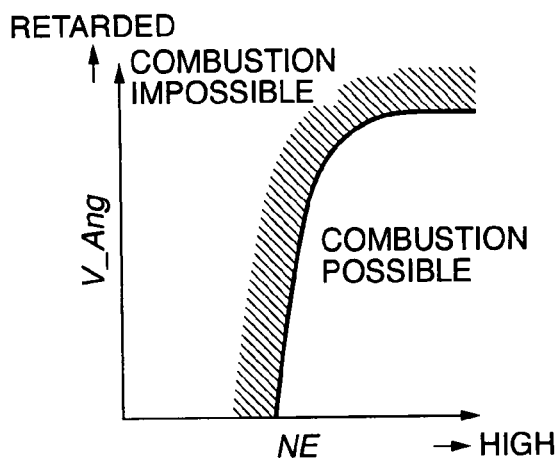
FIGS. 6A-6E are diagrams showing characteristics of maps for determining the possibility of combustion, which are stored by the controller.

FIG. 6A shows the characteristics of a region determination map having the engine rotation speed NE and the effective compression ratio modifying mechanism operating angle V_Ang as parameters. In this map, a region having a high engine rotation speed NE and an advanced effective compression ratio modifying mechanism operating angle V_Ang, or in other words a region having a high effective compression ratio, is set as the combustion possible region.

Figure 6D:
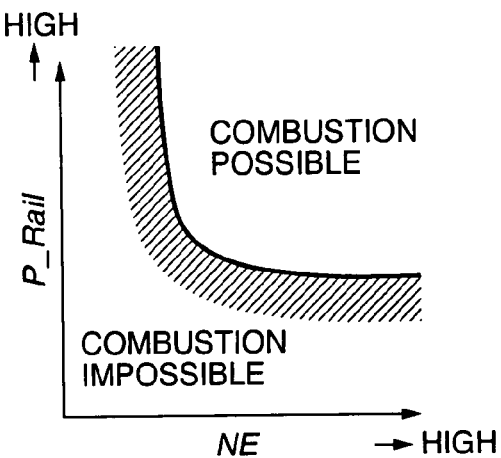
Figure 6B:
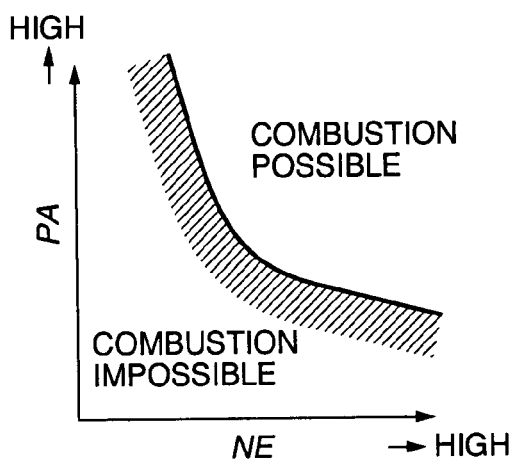

FIG. 6B shows the characteristics of a region determination map having the engine rotation speed NE and the atmospheric pressure PA as parameters. In this map, a region having a high engine rotation speed NE and a high atmospheric pressure PA is set as the combustion possible region.

Figure 6E:
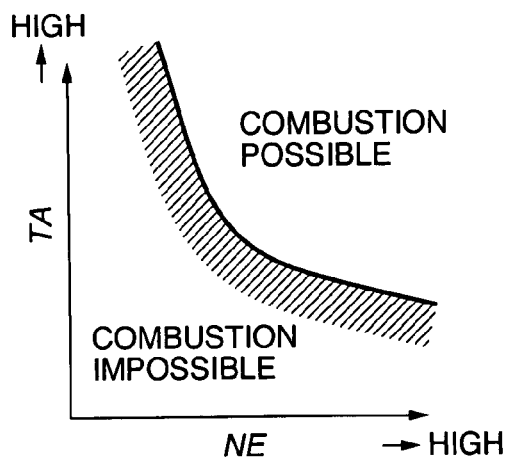
Figure 6C:
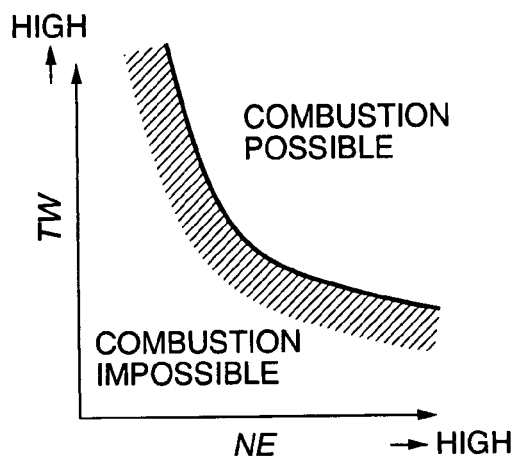

FIG. 6C shows the characteristics of a region determination map having the engine rotation speed NE and the engine cooling water temperature TW as parameters. In this map, a region having a high engine rotation speed NE and a high engine cooling water temperature TW is set as the combustion possible region.

FIG. 6D shows the characteristics of a region determination map having the engine rotation speed NE and the fuel pressure P_Rail as parameters. In this map, a region having a high engine rotation speed NE and a high fuel pressure P_Rail is set as the combustion possible region.

FIG. 6E shows the characteristics of a region determination map having the engine rotation speed NE and the intake air temperature TA as parameters. In this map, a region in which both the engine rotation speed NE and the intake air temperature TA are high is set as the combustion possible region.

Figure 7:
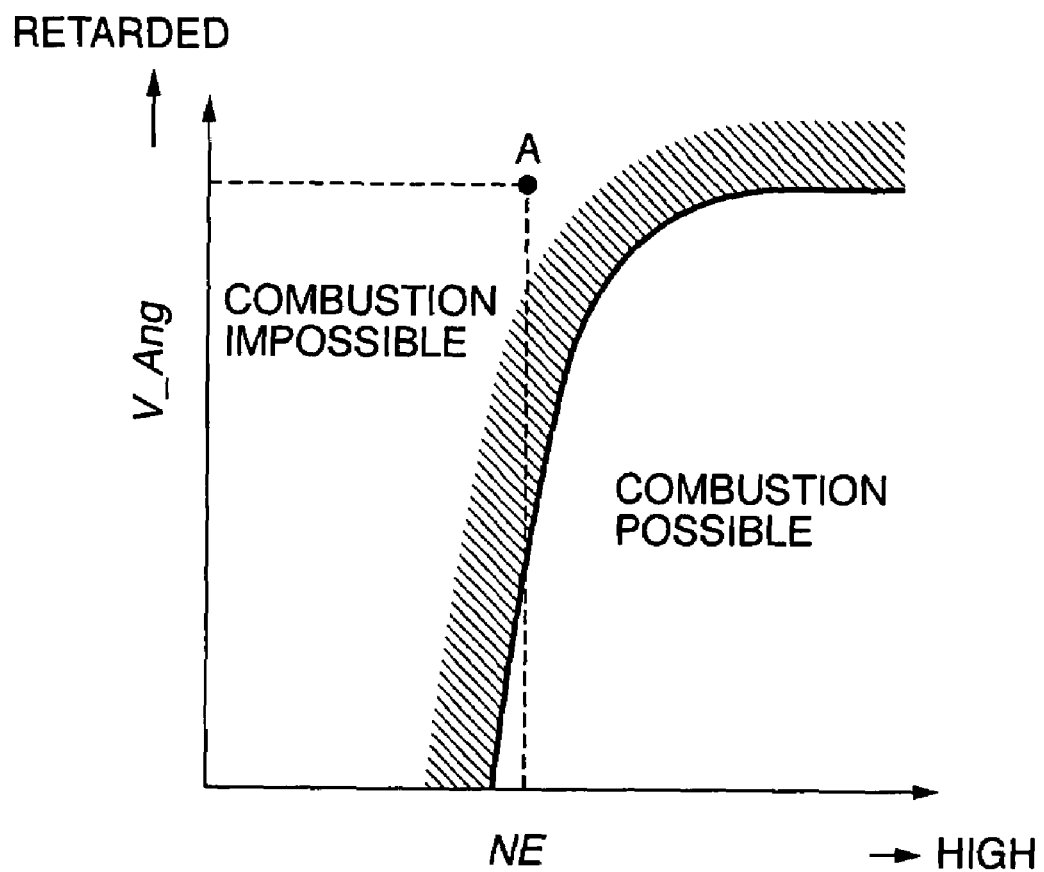
FIG. 7 is a diagram illustrating a determination process of the combustion possibility determination subroutine.

Next, referring to FIG. 7, a specific fuel injection start determination process will be described using the effective compression ratio modifying mechanism operating angle V_Ang as an example of a parameter.

The controller 104 reads the engine rotation speed NE in the step S401 of FIG. 4 and the effective compression ratio modifying mechanism operating angle V_Ang in the step S402.

Next, the controller 104 reads the map having the engine rotation speed NE and the effective compression ratio modifying mechanism operating angle V_Ang as parameters, or in other words the map shown in FIG. 6A, from the ROM in the step S1101 of the subroutine shown in FIG. 5.

Next, in the step S1102, the controller 104 refers to the map to determine from the engine rotation speed NE and the effective compression ratio modifying mechanism operating angle V_Ang whether the current operating condition of the internal combustion engine 101 is in the combustion possible region or the combustion impossible region. In the figure, the effective compression ratio modifying mechanism operating angle V_Ang exhibits a large amount of retardation, and a point A indicating the operating condition is positioned in the combustion impossible region.

On the basis of this determination result, the controller 104 outputs a fuel supply prohibition command in the step S1104.

On the basis of this output result, the controller 104 determines whether or not fuel supply has been permitted in the step S404 of FIG. 4, and obtains a negative determination result. Accordingly, the controller 104 prohibits fuel supply in the step S406.

To summarize the above description, similarly to the prior art, the controller 104 suppresses the effective compression ratio to be smaller when the engine rotation speed NE during start-up of the internal combustion engine 101 is within the resonance rotation speed region than when the engine rotation speed NE exceeds the resonance rotation speed region, and increases the effective compression ratio when the engine rotation speed NE rises beyond the resonance rotation speed region.

Meanwhile, the controller 104 determines whether or not the internal combustion engine 101 is capable of combustion by executing the fuel injection start determination routine of FIG. 4, and initiates fuel injection only when combustion is possible. Hence, a combustion defect such as a misfire can be prevented reliably even when an operation delay occurs in the effective compression ratio modifying mechanism 212 during start-up of the internal combustion engine 101, and as a result, deterioration of the exhaust gas composition can be prevented.

Next, referring to FIGS. 8, 9, 10A-10C, 11A-11C, 12A-12C, 13A and 13B, 14A-14C, and 15A and 15B, a second embodiment of this invention will be described.

Figure 8:
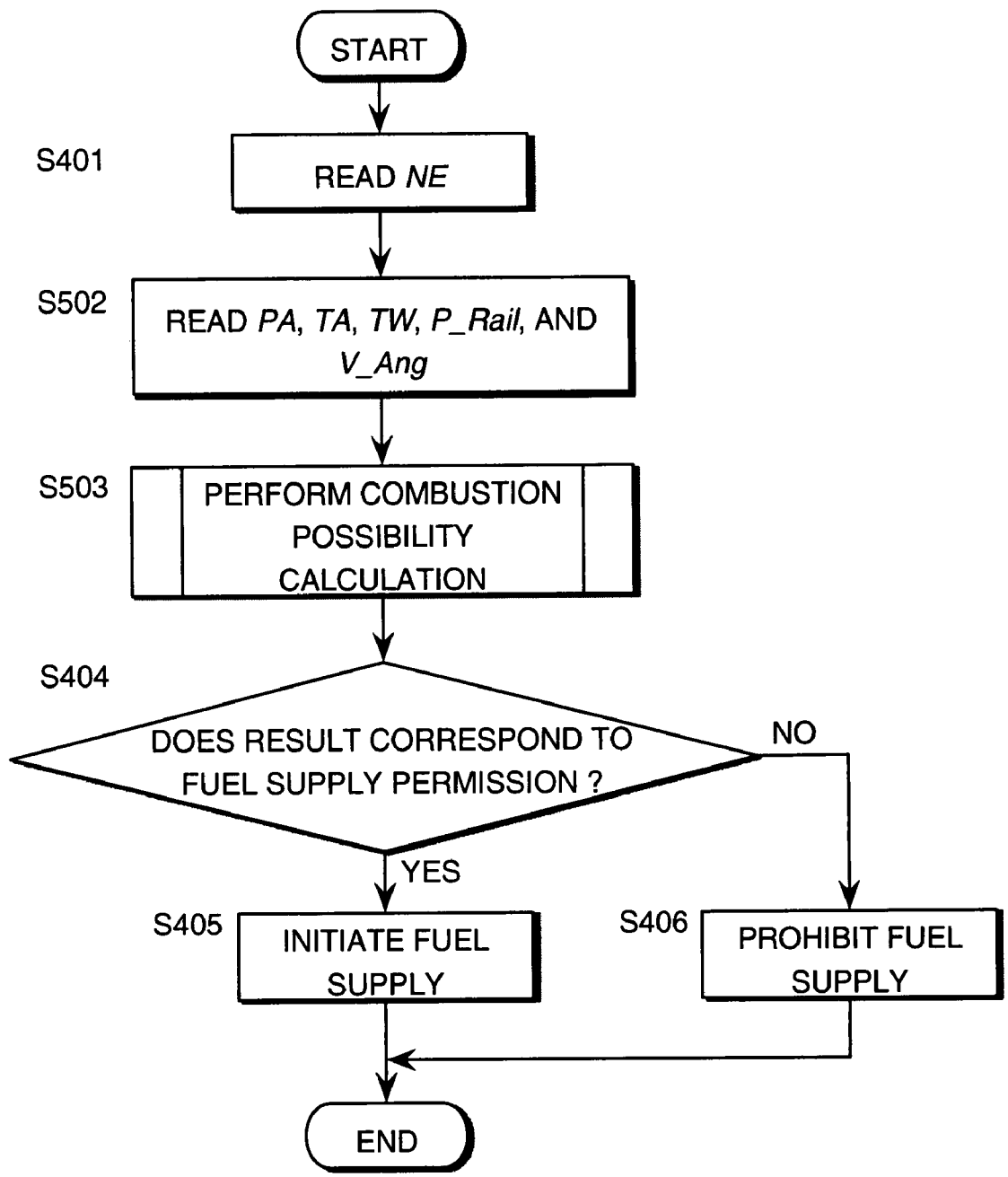
FIG. 8 is similar to FIG. 4, but shows a second embodiment of this invention.
Figure 9:
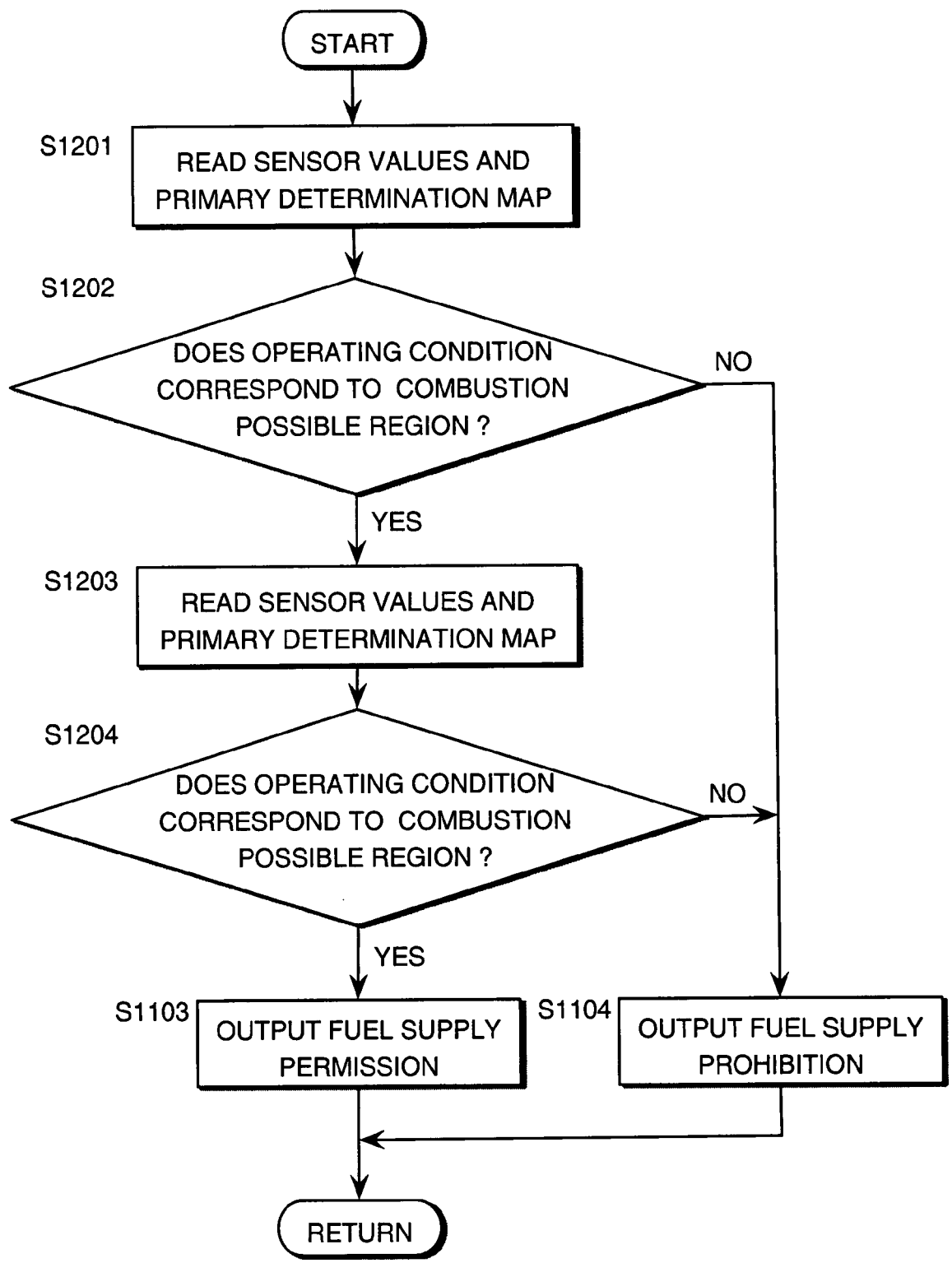
FIG. 9 is similar to FIG. 5, but shows a second embodiment of this invention.

In this embodiment, a routine shown in FIG. 8 is executed in place of the routine of the first embodiment, shown in FIG. 4, and a subroutine shown in FIG. 9 is executed in place of the subroutine shown in FIG. 5. Other constitutions of a start-up control device are identical to those of the first embodiment.

Referring to FIG. 8, the processing content of the step S401 and the steps S404-S406 is identical to that of the routine shown in FIG. 4.

In a step S502, the controller 104 reads two sensor values selected from the atmospheric pressure PA, the intake air temperature TA, the engine cooling water temperature TW, the fuel pressure P_Rail, and the effective compression ratio modifying mechanism operating angle V_Ang.

In a step S503, the controller 104 determines whether or not combustion is possible by executing the subroutine shown in FIG. 9.

In the steps S404-S406, the controller 104 selects a fuel supply start command or a fuel supply prohibition command in accordance with the result of the combustion possibility determination obtained in the step S503.

Referring to FIG. 9, in a step S1201 the controller 104 accesses a primary determination map having the engine rotation speed NE read in the step S401 of the routine in FIG. 8 and one of the two sensor values read in the step S502 as parameters from the ROM.

In a step S1202, the controller 104 refers to the primary determination map to determine from the engine rotation speed NE and one of the two sensor values whether the operating condition of the internal combustion engine 101 corresponds to the combustion possible region in the map or the combustion impossible region in the map. This determination will be referred to as a primary determination. Similar maps to the region determination maps employed in the first embodiment and having the characteristics shown in FIGS. 6A-6E are used as the primary determination maps. In this embodiment, however, a secondary determination is performed, as will be described below, and therefore the combustion possible region of each map may be made relatively wider than the combustion possible regions in the maps of the first embodiment, in which the secondary determination is not performed. This point will be described in further detail below.

When the operating condition of the internal combustion engine 101 is positioned in the combustion possible region of the map in the step S1202, the controller 104 performs the processing of a step S1203. When the operating condition of the internal combustion engine 101 is positioned in the combustion impossible region of the map in the step S1202, the controller 104 outputs a fuel supply prohibition command in the step S1104, similarly to the subroutine of FIG. 5, and then terminates the subroutine.

Figure 10A:
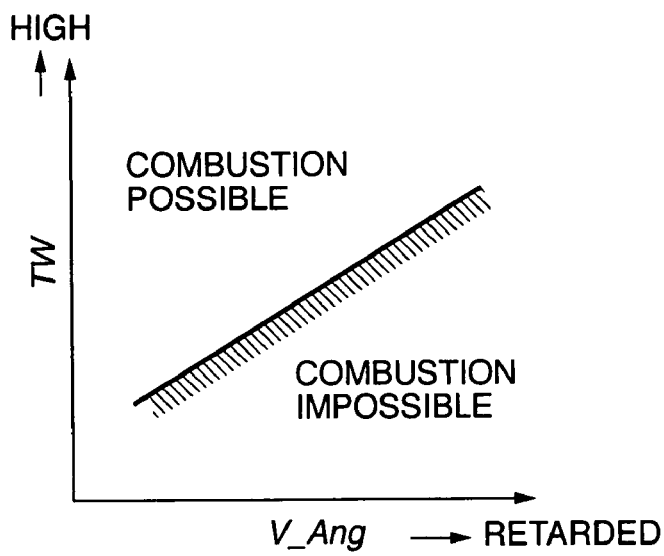
FIGS. 10A-10C are diagrams showing characteristics of maps for making a primary combustion possibility determination, which are stored by a controller according to the second embodiment of this invention.
Figure 10B:
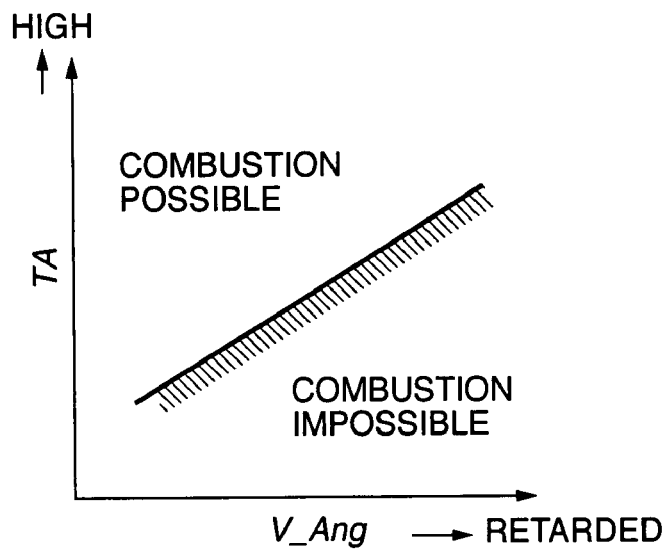
Figure 10C:
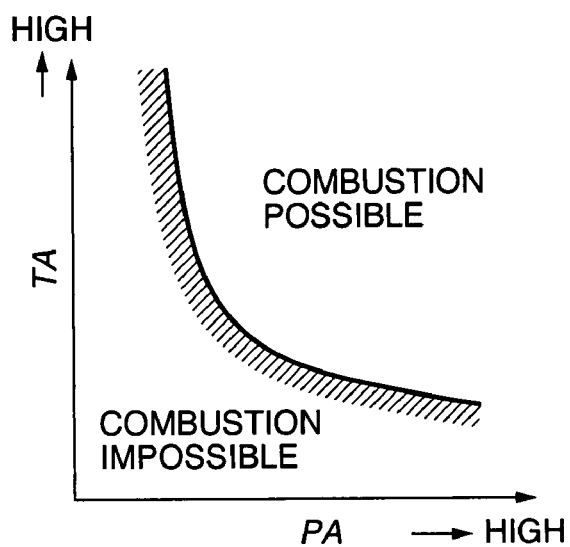

In the step S1203, the controller 104 accesses a secondary determination map having the two sensor values read in the step S502 as parameters, from among the secondary determination maps having the characteristics shown in FIGS. 10A-10C, from the ROM.

In a step S1204, the controller 104 determines whether the operating condition of the internal combustion engine 101 corresponds to the combustion possible region in the accessed secondary determination map or the combustion impossible region in the map. This determination will be referred to as a secondary determination.

Referring to FIGS. 10A-10C, the secondary determination maps will be described. The secondary determination maps are maps for dividing the operating condition of the internal combustion engine 101 into a combustion possible region and a combustion impossible region on the basis of two parameters selected from the effective compression ratio modifying mechanism operating angle V_Ang, the atmospheric pressure PA, the engine cooling water temperature TW, the fuel pressure P_Rail, and the intake air temperature TA.

FIG. 10A shows the characteristics of a secondary determination map having the cooling water temperature TW and the effective compression ratio modifying mechanism operating angle V_Ang as parameters. In this secondary determination map, a region having a high cooling water temperature TW and an advanced effective compression ratio modifying mechanism operating angle V_Ang, or in other words a region having a high effective compression ratio, is set as the combustion possible region.

FIG. 10B shows the characteristics of a secondary determination map having the intake air temperature TA and the effective compression ratio modifying mechanism operating angle V_Ang as parameters. In this secondary determination map, a region having a high intake air temperature TA and an advanced effective compression ratio modifying mechanism operating angle V_Ang, or in other words a region having a high effective compression ratio, is set as the combustion possible region.

FIG. 10C shows the characteristics of a secondary determination map having the intake air temperature TA and the atmospheric pressure PA as parameters. In this secondary determination map, a region in which both the intake air temperature TA and the atmospheric pressure PA are high is set as the combustion possible region.

The secondary determination map may be set in relation to various parameter combinations other than those of the maps having the characteristics shown in FIGS. 10A-10C. In other words, the secondary determination map may be set by selecting any two parameters arbitrarily from among the effective compression ratio modifying mechanism operating angle V_Ang, the atmospheric pressure PA, the engine cooling water temperature TW, the fuel pressure P_Rail, and the intake air temperature TA.

When the operating condition of the internal combustion engine 101 corresponds to the combustion possible region of the map in the step S1204, the controller 104 outputs a fuel supply permission command in the step S1103, and then terminates the subroutine.

When the operating condition of the internal combustion engine 101 corresponds to the combustion impossible region of the map in the step S1204, the controller 104 outputs a fuel supply impossible command in the step S1104, and then terminates the subroutine.

As described above, in this embodiment the determination as to whether or not the operating condition corresponds to the combustion possible region is made twice during start-up of the internal combustion engine 101 using different parameters. Therefore, the combustion possible region can be set wider in the primary determination map used in this embodiment than in the region determination map used in the first embodiment, in which the secondary determination is not performed. In other words, to prevent a combustion defect reliably, the combustion possible region must be set narrower in the region determination map used in the first embodiment, in which the secondary determination is not performed, than in the primary determination map of this embodiment.

Next, referring to FIGS. 11A-11C, the specific fuel injection start determination process of this embodiment will be described with respect to a case in which the engine rotation speed NE and effective compression ratio modifying mechanism operating angle V_Ang are selected as the parameters of the primary determination, and the effective compression ratio modifying mechanism operating angle V_Ang and intake air temperature TA are selected as the parameters of the secondary determination.

In the step S401 of the routine in FIG. 8, the controller 104 reads the engine rotation speed NE, and in the step S502, the controller 104 reads the effective compression ratio modifying mechanism operating angle V_Ang and the intake air temperature TA.

Next, in the step S1201 of the subroutine in FIG. 9, the controller 104 selects the engine rotation speed NE and effective compression ratio modifying mechanism operating angle V_Ang as the parameters of the primary determination, and selects the intake air temperature TA and effective compression ratio modifying mechanism operating angle V_Ang as the parameters of the secondary determination. The controller 104 then accesses the primary determination map having the characteristics shown in FIG. 11A, in which the engine rotation speed NE and effective compression ratio modifying mechanism operating angle V_Ang serve as parameters, from the ROM.

From the engine rotation speed NE and the effective compression ratio modifying mechanism operating angle V_Ang, the controller 104 determines that the operating condition of the internal combustion engine 101 corresponds to a point D in the figure. The point D is included in the combustion possible region, and therefore the controller 104 performs the processing of the step S1203.

Figure 11A:
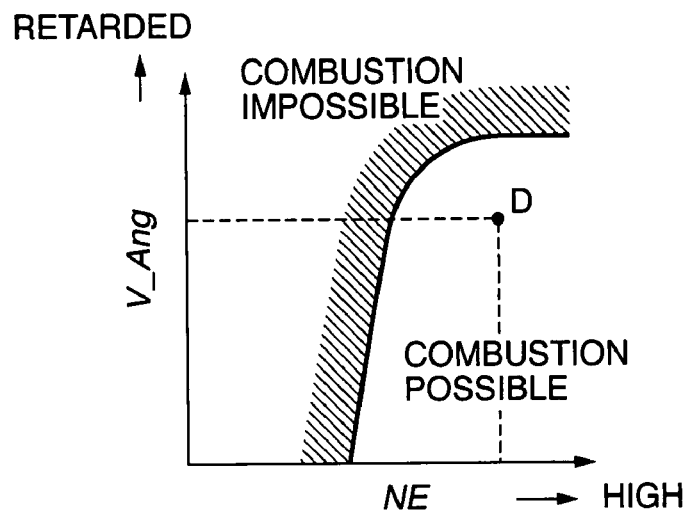
FIGS. 11A-11C are diagrams showing characteristics of maps for making a secondary combustion possibility determination, which are stored by the controller according to the second embodiment of this invention.
Figure 11B:
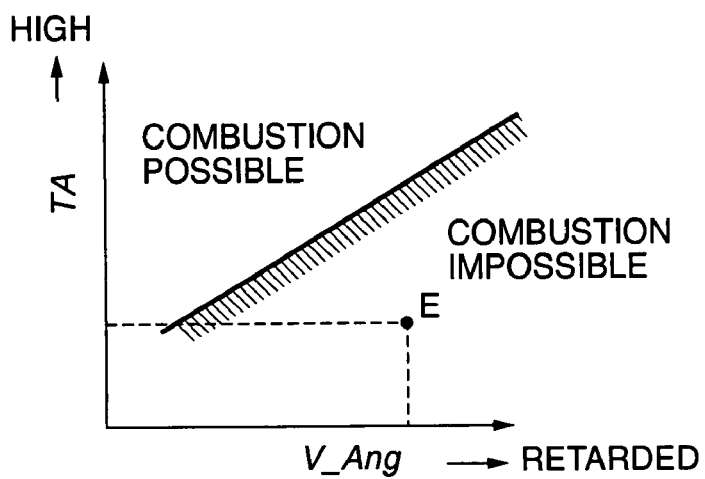

In the step S1202, the controller 104 accesses the secondary determination map having the characteristics shown in FIG. 11B, in which the effective compression ratio modifying mechanism operating angle V_Ang and the intake air temperature TA used as the secondary determination parameter serve as parameters, from the ROM. From the effective compression ratio modifying mechanism operating angle V_Ang and the intake air temperature TA, the controller 104 determines that the operating condition of the internal combustion engine 101 corresponds to a point E in the figure. The point E is included in the combustion impossible region, and therefore the controller 104 outputs a fuel supply prohibition command in the step S1104 and terminates the subroutine. Processing following termination of the subroutine is identical to that of the first embodiment.

Hence, the controller 104 continues to crank the engine 101 using the starter motor 102 without injecting fuel from the fuel injector 207 until the secondary determination produces an affirmative result.

Several variations may be applied to the secondary determination. The secondary determination may be performed only once on the basis of a single sensor value. For example, the secondary determination may be performed on the basis of the intake air temperature TA alone after performing the primary determination on the basis of the engine rotation speed NE and the atmospheric pressure PA.

On the other hand, more determinations may be performed on the basis of a plurality of different sensor values. For example, secondary, tertiary, and quartic determinations may be performed on the basis of the intake air temperature TA, the cooling water temperature TW, and the effective compression ratio modifying mechanism operating angle V_Ang, respectively.

The characteristics determined in the map used for the primary determination differ according to whether or not the secondary determination or higher order determinations are to be performed. As noted above, when the determination as to whether or not the operating condition of the internal combustion engine 101 is in the combustion possible region is made using only the primary determination, the combustion possible region must be narrowed, as shown in FIG. 11C, to ensure that combustion defects are prevented reliably.

Figure 11C:
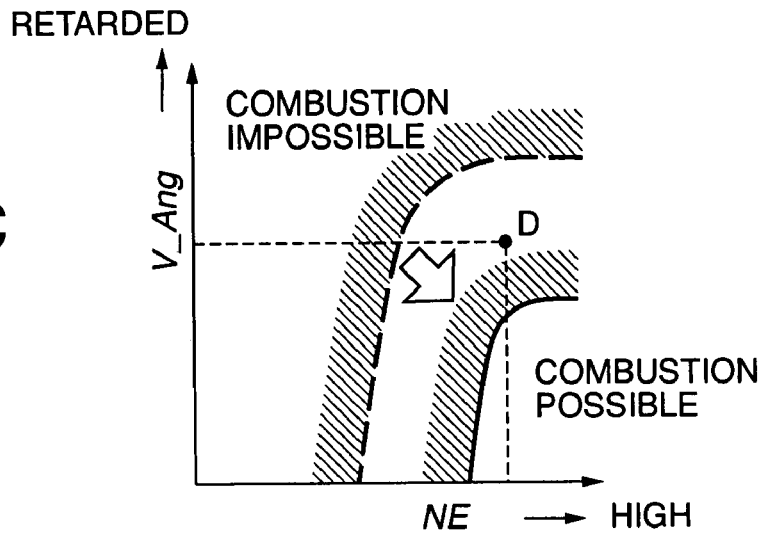

For example, a case in which the determination as to whether or not the operating condition of the internal combustion engine 101 is in the combustion possible region is made on the basis of the engine rotation speed NE and the effective compression ratio modifying mechanism operating angle V_Ang using the map having the characteristics shown in FIG. 11C and without performing the secondary determination will now be considered.

If the operating condition of the internal combustion engine 101 at this time exhibits identical conditions to the case described with reference to FIGS. 11A and 11B, then the point D of FIG. 11A is similarly determined to be in the combustion possible region in the map having the characteristics shown in FIG. 11C, as indicated by the broken line. In this case, as described above and as illustrated in FIG. 11B, the point E is determined to be in the combustion impossible region in the secondary determination, and therefore fuel injection is not initiated.

However, when the combustion possible region is determined from the map having the characteristics shown in FIG. 11C alone, fuel injection is begun under the same conditions. Hence, when the combustion possible region is to be determined using only the map having the characteristics shown in FIG. 11C and without performing the secondary determination, the combustion possible region is preferably preset to be narrow, as shown by the solid line in the figure, to ensure that combustion defects are prevented reliably.

Referring to FIGS. 12A-12C and FIGS. 13A and 13B, a specific fuel injection start determination process performed when the intake air temperature TA is at room temperature will be described. Here too, the engine rotation speed NE and effective compression ratio modifying mechanism operating angle V_Ang are used as the parameters of the primary determination, while the intake air temperature TA and effective compression ratio modifying mechanism operating angle V_Ang are used as the parameters of the secondary determination.

At a time t0, cranking of the internal combustion engine 101 begins. The effective compression ratio of the internal combustion engine 101 in this case is held at an effective compression ratio for start-up, which is smaller than an effective compression ratio for a low temperature combustion, to suppress vibration of the internal combustion engine 101 in the resonance rotation speed region. At the point in time when the controller 104 reads the primary determination map in the step S1201 of FIG. 9, the engine rotation speed NE is zero, and the operating condition of the internal combustion engine 101 corresponds to a point F in FIG. 13A, which is positioned in the combustion impossible region. As a result, the controller 104 determines that combustion is impossible in the step S1202, and does not perform fuel supply.

Figure 13A:
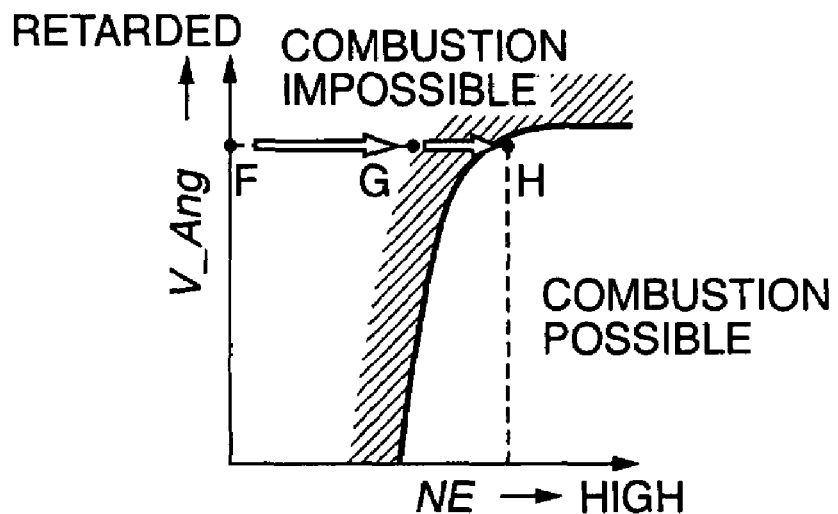
FIGS. 13A and 13B are diagrams illustrating variation in a combustion possibility determination result during the start-up control according to the second embodiment of this invention.

At a time t1, the engine rotation speed NE completes its passage through the resonance rotation speed region, as shown in FIG. 12B, and the controller 104 outputs an effective compression ratio increase command to the effective compression ratio modifying mechanism 212. Hence, during the period from the time t0 to the time t1, the effective compression ratio is not modified, and only the engine rotation speed NE rises due to cranking. As a result, the operating condition of the internal combustion engine 101 shifts from a point F to a point G in the primary determination map, as shown in FIG. 13A.

Even when the effective compression ratio increase command is output at the time t1, the effective compression ratio of the internal combustion engine 101 only begins to change from a time t3 onward due to an operation delay in the effective compression ratio modifying mechanism 212. Hence, from the time t1 to the time t3, the effective compression ratio does not change.

At a time t2, the operating condition of the internal combustion engine 101 is determined to have reached a point H within the combustion possible region as a result of the primary determination. The engine rotation speed in this state is for example 600-800 rpm. Then, in the step S1204 of FIG. 9, the controller 104 performs the secondary determination on the basis of the intake air temperature TA and the effective compression ratio modifying mechanism operating angle V_Ang.

Figure 13B:
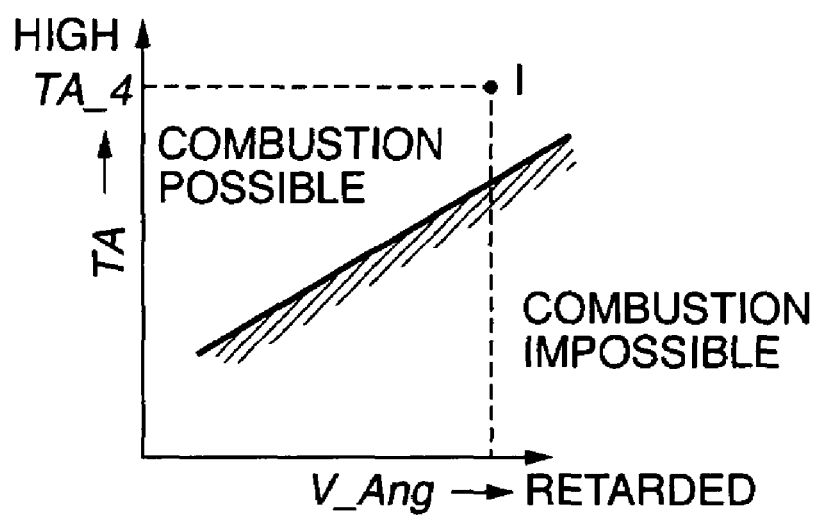

At this time, as shown in FIG. 13B, the intake air temperature TA is at room temperature TA_4 and the effective compression ratio is unchanged. Therefore, the operating condition of the internal combustion engine 101 corresponds to a point I, which is positioned in the combustion possible region. Hence, at the time t2, the controller 104 permits fuel supply and initiates combustion in the internal combustion engine 101.

Next, referring to FIGS. 14A-14C and FIGS. 15A and 15B, a specific fuel injection start determination process performed in a case where the intake air temperature TA is low will be described. Here too, the engine rotation speed NE and effective compression ratio modifying mechanism operating angle V_Ang are used as the parameters of the primary determination and the intake air temperature TA and effective compression ratio modifying mechanism operating angle V_Ang are used as the parameters of the secondary determination.

The processing of the period from the time t0 to the time t1 is identical to the processing of the case described above, in which the intake air temperature TA is at room temperature.

When the engine rotation speed NE completes its passage through the resonance rotation speed region at the time t1, the controller 104 outputs an effective compression ratio modification command to the effective compression ratio modifying mechanism 212 to modify the effective compression ratio to the effective compression ratio for combustion. However, due to the operation delay in the effective compression ratio modifying mechanism 212, modification of the operating angle of the effective compression ratio modifying mechanism does not actually begin until the time t3. Hence, during the period from the time t0 to the time t3, the effective compression ratio remains small. At the time t1, the engine rotation speed NE corresponds to a point K within the combustion impossible region of FIG. 15A. Therefore, at this point in time, fuel supply is not performed by the fuel injector 207.

At the time t2, the engine rotation speed NE reaches a point L due to cranking. The operating point L is positioned in the combustion possible region, and therefore the result of the primary determination made in the step S1202 of FIG. 9 shifts from combustion impossible to combustion possible. Accordingly, the controller 104 performs the secondary determination in the step S1204.

In the period from the time t0 to the time t2, the intake air temperature TA is at a low temperature TA_5 and the effective compression ratio remains unchanged. Hence, the operating condition of the internal combustion engine 101 in relation to the secondary determination map corresponds to a point P in FIG. 15B. The point P is included in the combustion impossible region, and therefore combustion is determined to be impossible in the step S1204. Hence, at the time t2, combustion is determined to be impossible in the secondary determination, despite having been determined to be possible in the primary determination, and as a result, fuel supply by the fuel injector 207 is not performed.

In the period from the time t2 to the time t3, the engine rotation speed NE rises while the effective compression ratio remains small. This corresponds to a shift from the point L to a point M in FIG. 15A. Accordingly, the result of the primary determination continues to indicate that combustion is possible. Meanwhile, the intake air temperature TA and effective compression ratio modifying mechanism operating angle V_Ang do not change from the time t2 to the time t3, and therefore the result of the secondary determination continues to indicate that combustion is impossible. Hence, during the period from the time t2 to the time t3, fuel supply by the fuel injector 207 is not performed.

Figure 15A:
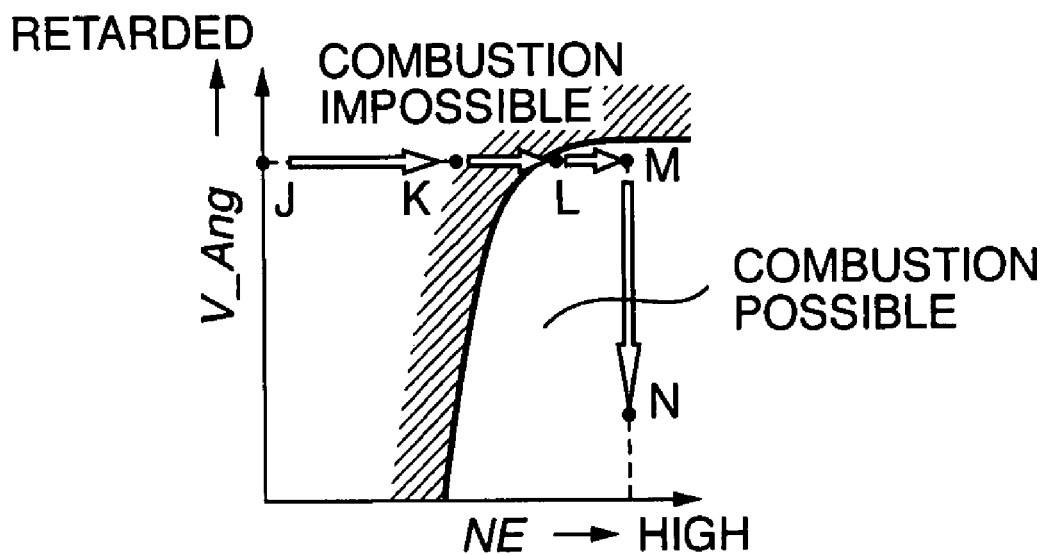
FIGS. 15A and 15B are similar to FIGS. 13A and 13B, but show a condition when the intake air temperature is low.

At the time t3, the effective compression ratio modifying mechanism operating angle V_Ang begins to change, and from this point in time to a time t4, the effective compression ratio increases. Therefore, in the period from the time t3 to the time t4, the operating condition of the internal combustion engine 101 shifts within the combustion possible region from the point M to a point N in the primary determination, as shown in FIG. 15A.

Figure 15B:
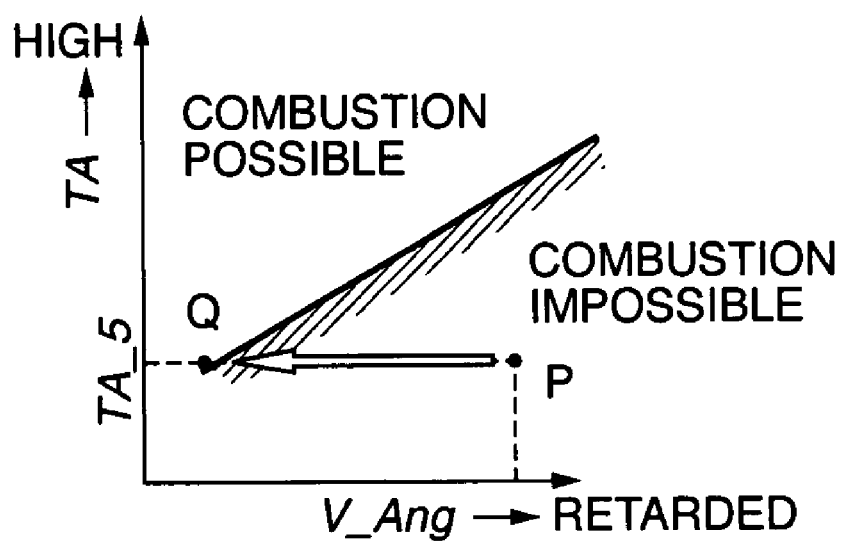

In the secondary determination, as shown in FIG. 15B, the operating condition of the internal combustion engine 101 shifts from the point P toward a point Q as the effective compression ratio increases. The point Q reached at the time t4 is positioned in the combustion possible region. Therefore, fuel supply by the fuel injector 207 begins at the time t4.

According to this embodiment as described above, the determination as to whether or not combustion is possible is performed by the primary determination and secondary determination, which are based on different parameters, and fuel supply by the fuel injector 207 is only performed when the determination results of both the primary determination and secondary determination indicate that combustion is possible. Hence, the possibility of fuel supply is determined more strictly than in the first embodiment.

Referring to FIGS. 16-19, FIGS. 20A-20G, FIGS. 21A-21C, and FIGS. 22A-22C, a third embodiment of this invention will be described.

This embodiment is executed in combination with the first embodiment or second embodiment. More specifically, a determination as to whether or not the internal combustion engine 101 is capable of combustion is made on the basis of the engine rotation speed NE and at least one other parameter indicating the operating condition of the internal combustion engine 101, and fuel supply by the fuel injector 207 is performed in accordance with the determination result. Simultaneously in this embodiment, the time required for combustion to become possible from the beginning of cranking of the internal combustion engine 101 is estimated, and the rotation speed increase rate of the starter motor 102 is varied in accordance with the estimation result.

Figure 16:
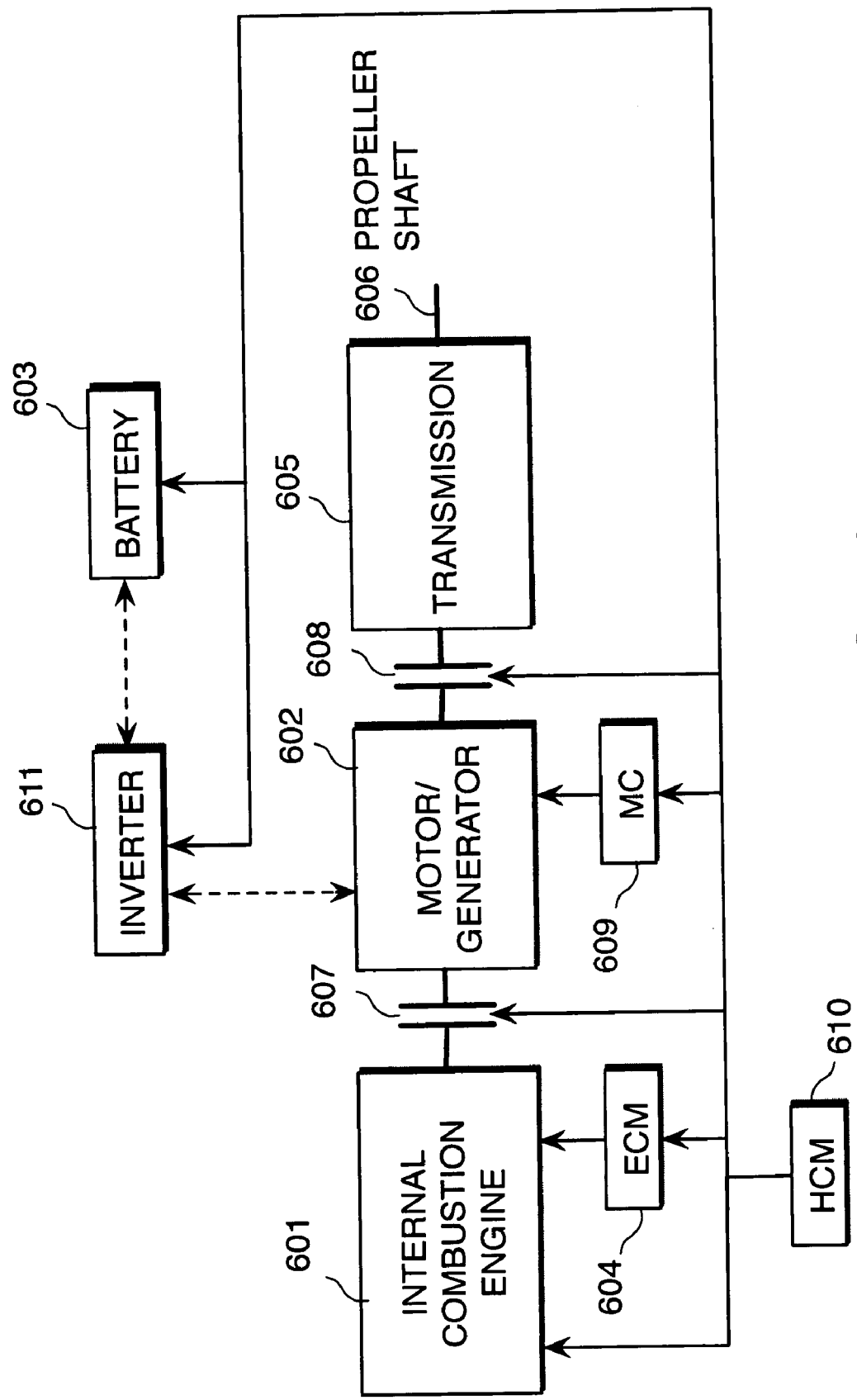
FIG. 16 is a schematic diagram illustrating the constitution of a start-up control device for an internal combustion engine according to a third embodiment of this invention.

Referring to FIG. 16, this embodiment is applied to a hybrid drive electric vehicle.

The hybrid drive electric vehicle comprises a power train constituted by an internal combustion engine 601, a motor/generator 602, a transmission 605, a propeller shaft 606, a first clutch 607, and a second clutch 608.

The internal combustion engine 601 is constituted identically to the internal combustion engine 101 of the first and second embodiments.

The motor/generator 602 is joined to the internal combustion engine 601 via the clutch 607.

The transmission 605 is joined to the motor/generator 602 via the clutch 608. The propeller shaft 606 is joined to the transmission 605.

An operation of the internal combustion engine 601 is controlled by an engine control module (ECM) 604. An operation of the motor/generator 602 is controlled by a motor controller (MC) 609. A hybrid control module (HCM) 910 controls the ECM 604, MC 609, first clutch 607, and second clutch 608.

The ECM 604, MC 609, and HCM 910 are respectively constituted by microcomputers each comprising a central processing unit (CPU), read-only memory (ROM), random access memory (RAM), and an input/output interface (I/O interface). It should be noted that the ECM 604, MC 609, and HCM 910 may each be constituted by a single microcomputer, or one or a plurality of the ECM 604, MC 609, and HCM 910 may be constituted by a plurality of microcomputers.

By having the HCM 610 control engagement and disengagement of the first clutch 607 and second clutch 608, the hybrid drive electric vehicle can be driven using only the output of the internal combustion engine 601, only the output of the motor/generator 602, or the output of both the internal combustion engine 601 and the motor/generator 602. Similarly, an arbitrary selection can be made between power generation by the motor/generator 602 using the output of the internal combustion engine 601 and power generation by the motor/generator 602 using rotational energy of the propeller shaft 606, or in other words regenerative braking. Cranking of the internal combustion engine 601 is performed by the motor/generator 602 with the clutch 607 engaged.

The motor/generator 602 is connected to an inverter 611. The inverter 611 is connected to a battery 603. When the motor/generator 602 is used as a power generator, the inverter 611 converts alternating current power generated by the motor/generator 602 into direct current power and charges the battery 603 with this direct current power.

When the motor/generator 602 is used as an electric motor, the direct current power of the battery 603 is converted into alternating current power and supplied thus to the motor/generator 602.

A determination as to whether to use the motor/generator 602 as a power generator or an electric motor is made in accordance with a command signal issued to the inverter 611 by the MC 609. Various types of battery such as a lithium ion battery, a nickel hydrogen battery, and a lead battery, or an electric two-layer capacitor, i.e. a so-called power capacitor, may be used as the battery 603.

Figure 17:
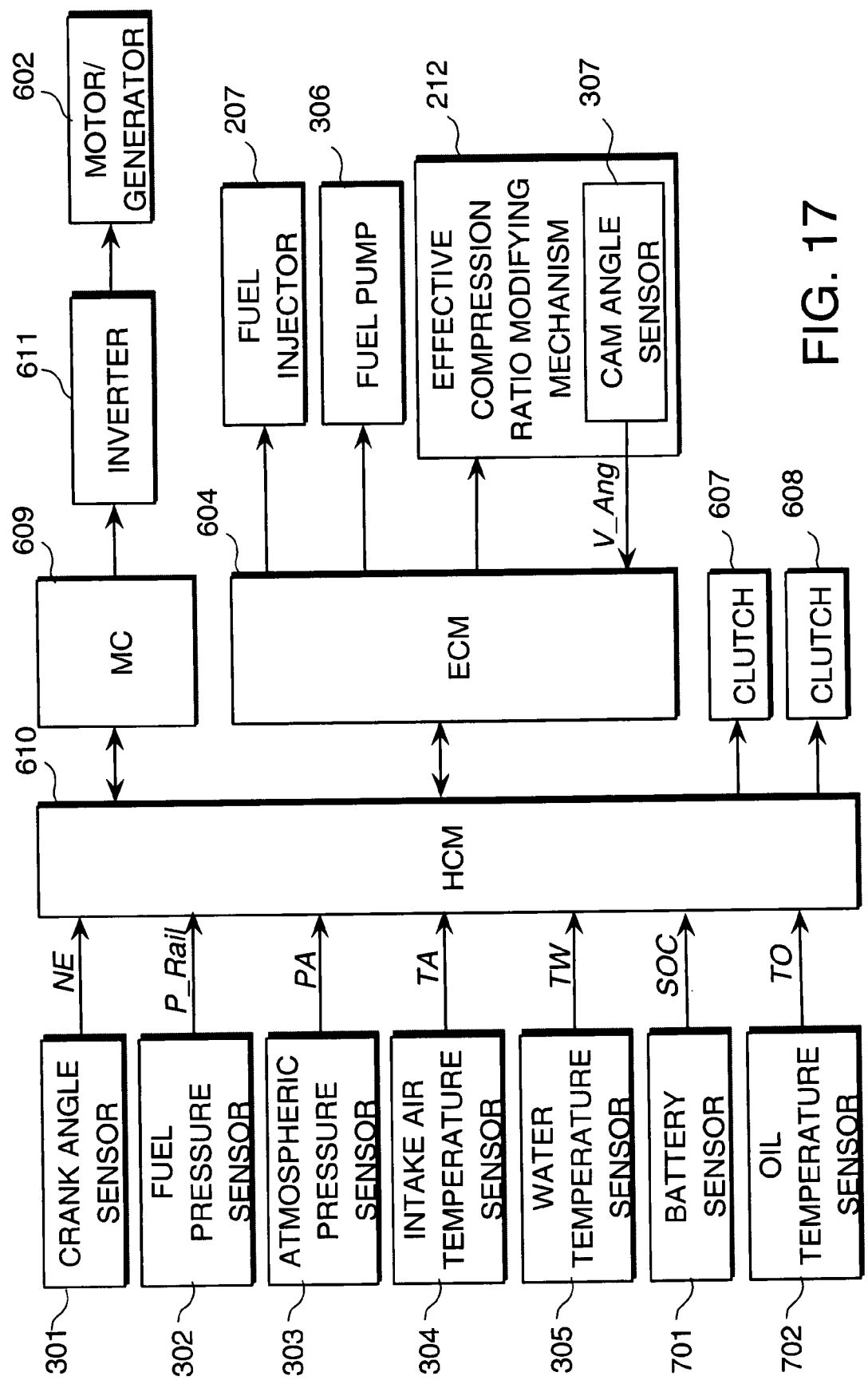
FIG. 17 is a block diagram illustrating input/output signals of a hybrid control module, an engine control module, and a motor controller according to the third embodiment of this invention.

Referring to FIG. 17, a crank angle signal NE from the crank angle sensor 301, a fuel pressure signal P_Rail from the fuel pressure sensor 302, an atmospheric pressure signal PA from the atmospheric pressure sensor 303, an intake air temperature TA from the intake air temperature sensor 304, a cooling water temperature signal TW from the water temperature sensor 305, a battery state of charge SOC from a battery sensor 701, and a lubricating oil temperature TO from an oil temperature sensor 702 are input as signals into the HCM 610.

The HCM 610 outputs a target motor torque and a target rotation speed, calculated on the basis of these signals, to the MC 602 as signals.

Further, the HCM 610 outputs a target engine output torque and a target operating angle of the effective compression ratio modifying mechanism 212, calculated on the basis of the above signals, to the ECM 604 as signals. The HCM 610 also outputs a clutch engagement/disengagement command as a signal to the first clutch 607 and second clutch 608, respectively.

The effective compression ratio modifying mechanism operating angle V_Ang is input into the ECM 604 as a signal from the cam angle sensor 307 of the effective compression ratio modifying mechanism 212. Further, the ECM 604 controls fuel injection by the fuel injector 207, an operation of the fuel pump 306, and the operating angle of the effective compression ratio modifying mechanism 212.

Upon reception of an engine cranking start command from the MC 609, the inverter 611 initiates cranking of the internal combustion engine 601 by supplying the power of the battery 603 to the motor/generator 602.

During cranking of the internal combustion engine 601, the HCM 610 estimates the time required from the beginning of cranking to the point at which the internal combustion engine 601 becomes capable of combustion from the fuel pressure P_Rail, the atmospheric pressure PA, the intake air temperature TA, the cooling water temperature TW, the lubricating oil temperature TO, and so on. When the estimation result exceeds a predetermined time, the start of combustion is advanced by increasing the rotation speed increase rate of the internal combustion engine 601 during cranking.

The rotation speed increase rate during cranking is increased by increasing the cranking torque of the motor/generator 602. The HCM 610 reads the state of charge (SOC) of the battery 603, and calculates a cranking torque limit from the SOC of the battery 603. By setting an upper limit value of the cranking torque increase as the cranking torque limit, a reduction in performance due to overdischarge of the battery 603, shock accompanying the generation of excessive torque, damage to the motor/generator 602 caused by an excessive electric load, and so on are prevented.

Figure 18:
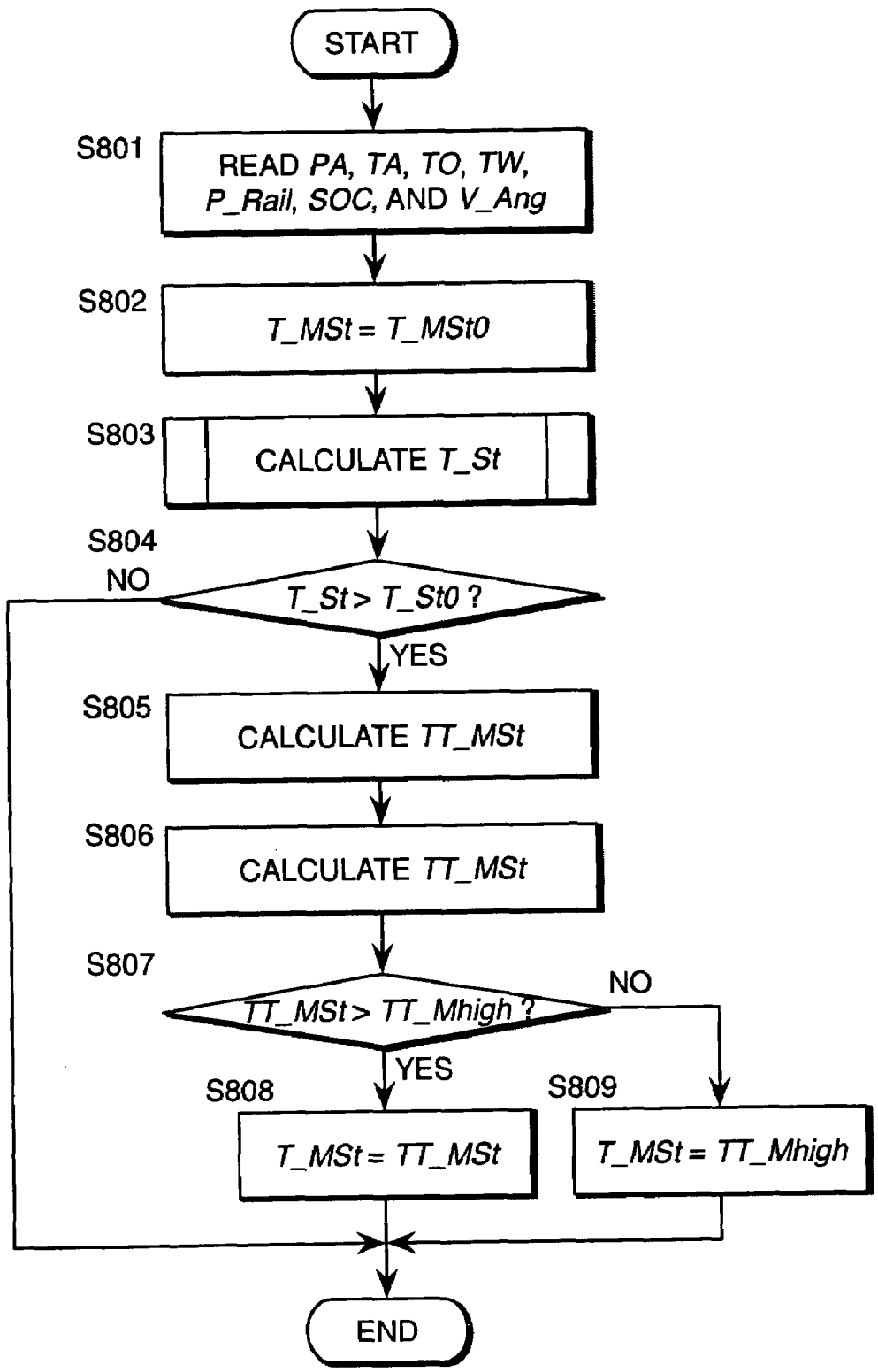
FIG. 18 is a flowchart illustrating a target cranking torque calculation routine executed by the hybrid control module according to the third embodiment of this invention.

Referring to FIG. 18, a target cranking torque calculation routine executed by the HCM 610 will be described.

This routine is executed prior to the beginning of cranking of the internal combustion engine 601. More specifically, for example, this routine is executed before the start of the fuel injection start determination routine of the first embodiment shown in FIG. 4 or before the start of the fuel injection start determination routine shown in FIG. 8.

First, in a step S801, the HCM 610 reads the air pressure PA, the intake air temperature TA, the lubricating oil temperature TO, the engine cooling water temperature TW, the fuel pressure P_Rail, the battery state of charge SOC, and the effective compression ratio modifying mechanism operating angle V_Ang.

In a step S802, the HCM 610 sets a target cranking torque T_Mst of the motor/generator 602 at a predetermined value T_MSt0. The predetermined value T_MSt0 is the cranking torque of a predetermined standard state.

Figure 19:
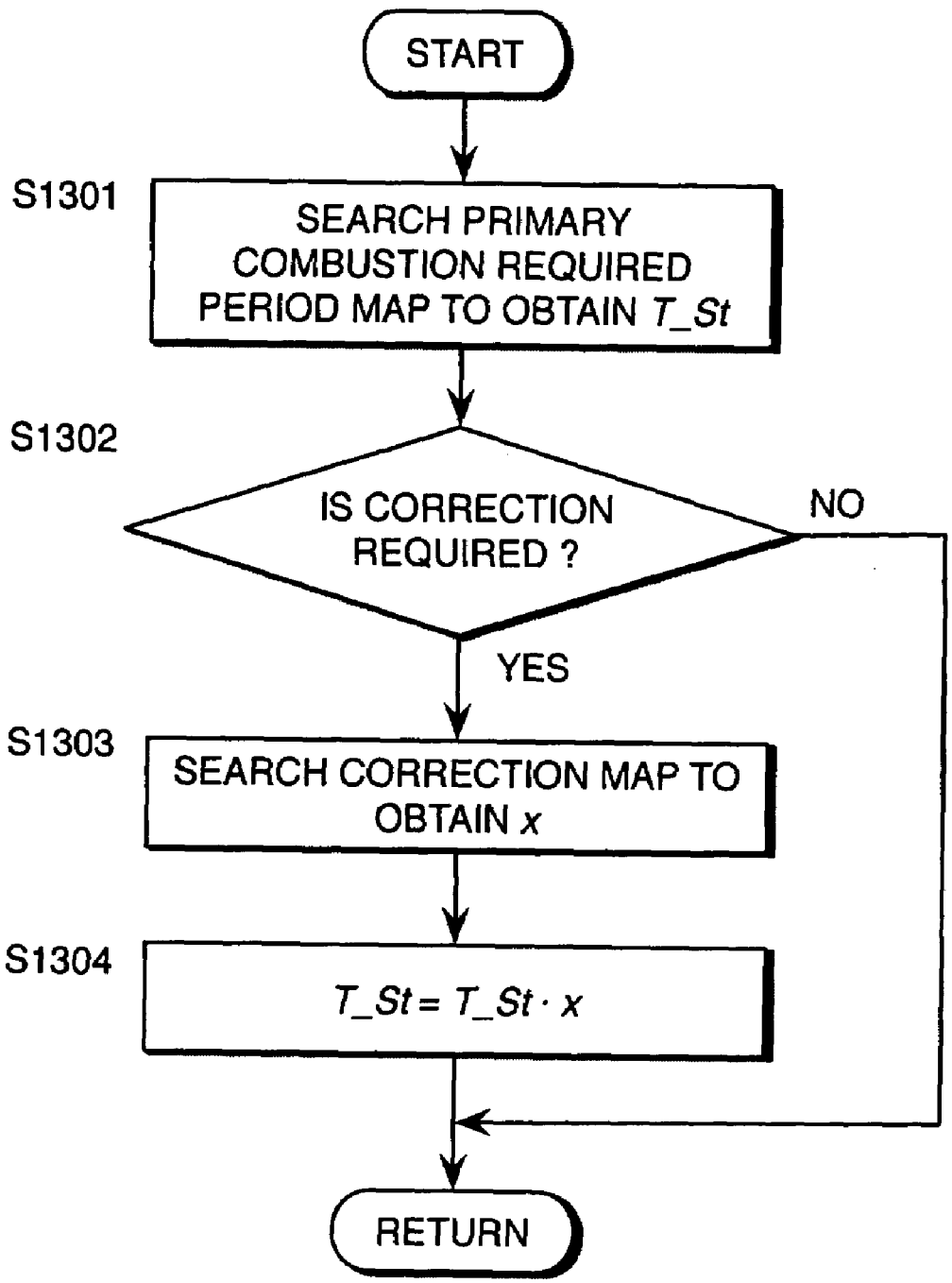
FIG. 19 is a flowchart illustrating a required combustion start time calculation subroutine executed by the hybrid control module according to the third embodiment of this invention.

In a step S803, the HCM 610 determines a required combustion start time T_St for the internal combustion engine 601 to become capable of combustion on the basis of the data read in the step S801 using a subroutine shown in FIG. 19. This subroutine will be described below.

In a step S804, the HCM 610 determines whether or not the required combustion start time T_St exceeds a predetermined time T_St0. The predetermined time T_St0 corresponds to a predetermined time from the start of cranking in the standard state to the start of combustion in the internal combustion engine 601.

When the required combustion start time T_St exceeds the predetermined time T_St0, the HCM 610 performs the processing of steps S805-S809 to advance the start of combustion by raising the rotation speed increase rate of the internal combustion engine 601 through cranking. When the required combustion start time T_St does not exceed the predetermined time T_St0, the HCM 610 terminates the routine without performing subsequent processing.

In the step S805, the HCM 610 determines a cranking torque limit TT_Mhigh. The cranking torque limit TT_Mhigh is determined from the battery state of charge SOC read in the step S801 by referring to a map having the characteristics shown in FIG. 22, which is stored in the ROM in advance.

This map calculates the cranking torque limit TT_Mhigh in accordance with the battery state of charge SOC. When the battery state of charge SOC is equal to or smaller than a predetermined value SOC_0, the cranking torque limit TT_Mhigh is set smaller as the battery state of charge SOC decreases. When the battery state of charge SOC is greater than the predetermined value SOC_0, the cranking torque limit TT_Mhigh is set at a constant value.

Figure 23:
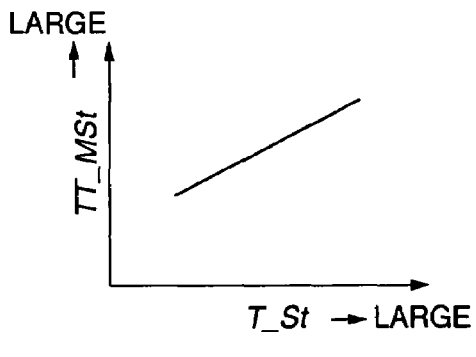
FIG. 23 is a diagram illustrating the characteristics of a map of a corrected cranking torque TT_MSt, which is stored by the hybrid control module according to the third embodiment of this invention.

In the step S806, the HCM 610 determines a corrected cranking torque TT_MSt. The corrected cranking torque TT_MSt is determined from the required combustion start time T_St determined in the step S803 by referring to a map having the characteristics shown in FIG. 23, which is stored in the ROM in advance.

In this map, the corrected cranking torque TT_MSt is set at a larger value as the required combustion start time T_St increases.

In the step S807, the HCM 610 determines whether or not the corrected cranking torque TT_MSt is equal to or smaller than the cranking torque limit TT_Mhigh. In other words, an upper limit value of the cranking torque is set as the cranking torque limit TT_Mhigh, which is determined in accordance with the SOC of the battery 603, to prevent a reduction in performance due to overdischarge of the battery 603, shock accompanying the generation of excessive torque, damage to the motor/generator 602 caused by an excessive electric load, and so on.

When the corrected cranking torque TT_MSt is equal to or smaller than the cranking torque limit TT_Mhigh in the step S807, the HCM 610 sets the target cranking torque limit T_MSt to be equal to the corrected cranking torque TT_MSt in the step S808, and then terminates the routine.

When the corrected cranking torque TT_MSt is greater than the cranking torque limit TT_Mhigh in the step S807, the HCM 610 sets the target cranking torque T_MSt to be equal to the cranking torque limit TT_Mhigh in the step S808, and then terminates the routine.

Referring to FIG. 19, a subroutine for calculating the required combustion start time T_St will be described.

In a first step S1301, the HCM 601 selects any one of the parameters read in the step S801 of FIG. 18, and determines the required combustion start time T_St from the target cranking torque T_MSt set in the step S802 and the selected parameter by referring to a map of the required combustion start time, which is stored in the ROM in advance.

Figure 20:
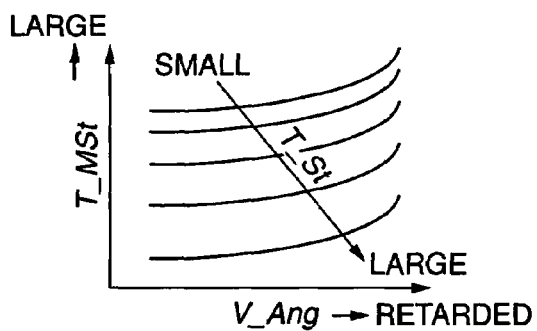
FIG. 20 is a diagram showing the characteristics of a map for calculating the required combustion start time, which is stored by the hybrid control module according to the third embodiment of this invention.

Referring to FIG. 20, the characteristics of the required combustion start time map will be described. Here, the effective compression ratio modifying mechanism operating angle V_Ang is used as a parameter. In the required combustion start time map having the target cranking torque T_MSt and the effective compression ratio modifying mechanism operating angle V_Ang as parameters, the required combustion start time T_St takes a larger value as the target cranking torque T_MSt decreases and the effective compression ratio modifying mechanism operating angle V_Ang becomes more advanced, i.e. as the effective compression ratio decreases.

In this map, the effective compression ratio modifying mechanism operating angle V_Ang is used as the parameter that is combined with the target cranking torque T_MSt, but any of the intake air temperature TA, lubricating oil temperature TO, engine cooling water temperature TW, and atmospheric pressure PA may be used instead of the effective compression ratio modifying mechanism operating angle V_Ang.

Returning to FIG. 19, in a step S1302 the HCM 610 decides whether or not to correct the required combustion start time T_St using one or two of the sensor values not selected in the step S1301 as parameters.

Specifically, the HCM 610 determines to correct the required combustion start time T_St when the engine cooling water temperature TW is lower than a predetermined value TW_0. It is also possible to perform this determination taking a further parameter into consideration. For example, the HCM 610 can determine to correct the required combustion start time T_St when the engine cooling water temperature TW is lower than a predetermined value TW_0 or when the intake air temperature TA is lower than a predetermined value TA_0.

When it is decided not to correct the required combustion start time T_St in the step S1302, the HCM 610 terminates the subroutine. In this case, the required combustion start time T_St determined in the step S1101 is used to calculate the corrected cranking torque in the step S806 of FIG. 18.

When it is decided to correct the required combustion start time T_St in the step S1302, the HCM 610 performs the processing of a step S1303.

In the step S1303, the HCM 610 calculates a correction amount x from a correction amount map stored in the ROM in advance.

Referring to FIGS. 21A-21D, the characteristics of the correction amount map will be described.

Figure 21D:
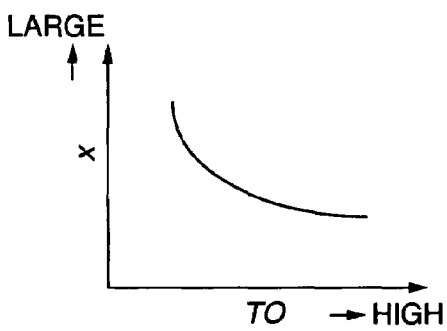
FIGS. 21A-21D are diagrams illustrating the characteristics of maps of a required combustion start time correction amount x, which are stored by the hybrid control module according to the third embodiment of this invention.
Figure 21A:
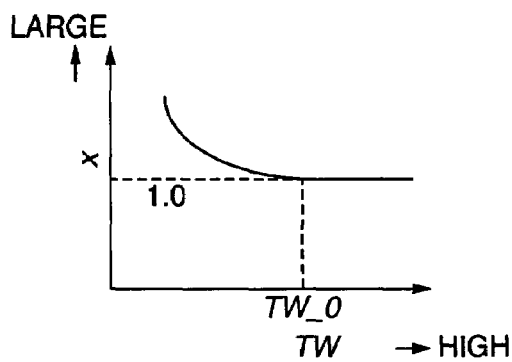
Figure 22:
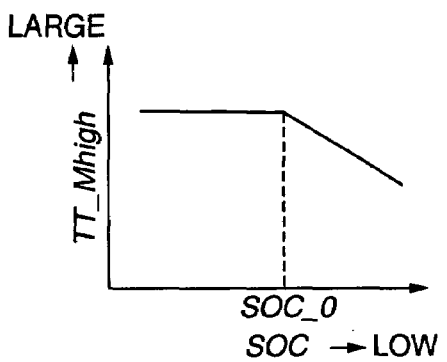
FIG. 22 is a diagram illustrating the characteristics of a map of a cranking torque limit TT_Mhigh, which is stored by the hybrid control module according to the third embodiment of this invention.

FIG. 21A shows the characteristics of a map for calculating a required combustion start time correction coefficient x in accordance with the engine cooling water temperature TW. In this map, when the cooling water temperature TW is equal to or lower than the predetermined value Tw_0, the required combustion start time correction coefficient x is set larger as the cooling water temperature TW decreases. When the cooling water temperature TW is higher than the predetermined value TW_0, the required combustion start time correction coefficient x is set at 1.0. When the required combustion start time correction coefficient x is 1.0, correction is not performed.

Figure 21B:
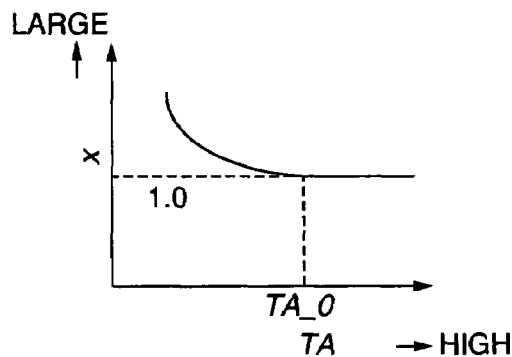

FIG. 21B shows the characteristics of a map for calculating the required combustion start time correction coefficient x in accordance with the intake air temperature TA. In this map, when the intake air temperature TA is equal to or lower than the predetermined value TA_0, the required combustion start time correction coefficient x is set larger as the intake air temperature TA decreases. When the intake air temperature TA is higher than the predetermined value TA_0, the required combustion start time correction coefficient x is set at 1.0.

Figure 21C:
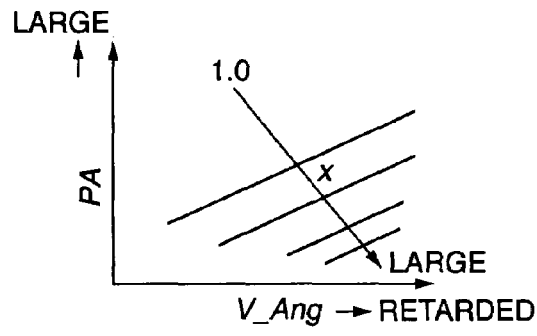

FIG. 21C shows the characteristics of a map for calculating the required combustion start time correction coefficient x in accordance with the atmospheric pressure PA and the effective compression ratio modifying mechanism operating angle V_Ang. In this map, the required combustion start time correction coefficient x is set larger as the atmospheric pressure PA decreases and the effective compression ratio modifying mechanism operating angle V_Ang becomes more retarded, or in other words as the effective compression ratio decreases.

FIG. 21D shows the characteristics of a map for calculating the required combustion start time correction coefficient x in accordance with the lubricating oil temperature TO. In this map, the required combustion start time correction coefficient x is set larger as the lubricating oil temperature TO decreases.

In a step S1304, the HCM 610 corrects the required combustion start time T_St by multiplying the required combustion start time correction coefficient x by the required combustion start time T_St. Following the processing of the step S1304, the HCM 610 terminates the subroutine.

The required combustion start time T_St is corrected once in the steps S1303 and S1304 on the basis of a single parameter, but this correction may be performed a plurality of times on the basis of a plurality of different parameters. For example, when the required combustion start time T_St is calculated on the basis of the effective compression ratio modifying mechanism operating angle V_Ang in the step S1301, the correction may be performed only once on the basis of the intake air temperature TA alone. Alternatively, the correction may be performed twice on the basis of the intake air temperature TA and the cooling water temperature TW.

Further, the characteristics of the map used in the step S1301 are preferably varied depending on whether or not the correction steps S1302-S1304 are provided in the routine of FIG. 19 or in accordance with the number of corrections. In so doing, a situation in which the required combustion start time T_St falls greatly below the actual required combustion start time when the correction steps S1302-S1304 are not provided or the number of corrections is reduced can be prevented.

Referring to FIGS. 24A-24C, a fuel injection start determination process performed during post-warm-up start-up of the internal combustion engine 601 according to this embodiment will be described.

Here, the required combustion start time T_St is determined from the effective compression ratio modifying mechanism operating angle V_Ang, and the required combustion start time correction coefficient x is calculated on the basis of the cooling water temperature TW.

At a time t0, start-up of the internal combustion engine 601 begins. In this embodiment, the required combustion start time T_St is estimated by executing the routine in FIG. 18 prior to the beginning of start-up. Since start-up is performed following warm-up, the cooling water temperature TW is high, and in this case, as shown in FIG. 21A, the required combustion start time correction coefficient x is 1.0. Therefore, substantially no correction of the required combustion start time T_St is performed.

Once the cranking torque T_MSt has been set at T_MSt0 through execution of the routine in FIG. 18, cranking of the internal combustion engine 601 begins at the time t0. The internal combustion engine 601 is cranked by the motor/generator 602, and in accordance with the combustion possibility determination of the second embodiment, fuel supply is initiated at a time t1. Hence, under the post-warm-up start-up condition described above, this embodiment exhibits no special actions.

Referring to FIGS. 25A-25C, a fuel injection start determination process performed during cold start-up of the internal combustion engine 601 according to this embodiment will be described.

The required combustion start time T_St is estimated prior to start-up of the internal combustion engine 601 at a time t0.

The required combustion start time T_St is calculated in the same manner as that of the post-warm-up start-up, and the required combustion start time correction coefficient x is calculated from the cooling water temperature TW by referring to the map having the characteristics shown in FIG. 21A, which is stored in the ROM in advance. Since the internal combustion engine 601 is started cold, the cooling water temperature TW takes a smaller value than the predetermined value TW_0, and the required combustion start time correction coefficient x takes a larger value than 1.0.

After being corrected by the required combustion start time correction coefficient x, the required combustion start time T_St becomes larger than the predetermined time T_St0. In the steps S805-S806 of the routine in FIG. 18, the HCM 610 determines the cranking torque limit TT_Mhigh on the basis of the state of charge SOC of the battery 603, and calculates the corrected cranking torque TT_MSt.

When the corrected cranking torque TT_MSt is not used as the target cranking torque T_MSt and the target cranking torque T_MSt is set at the predetermined valve T_MSt0, the increase in the engine rotation speed NE during start-up of the internal combustion engine 601 slows. Due to the operation delay in the effective compression ratio modifying mechanism 212, the operating angle of the effective compression ratio modifying mechanism only begins to change from a time t3 onward, as shown by the dotted lines in FIGS. 25A-25C.

However, when the corrected cranking torque TT_MSt is employed as the target cranking torque T_MSt, the rate of increase in the engine rotation speed NE during start-up of the internal combustion engine 601 increases, and oil pressure is supplied to the effective compression ratio modifying mechanism 212 earlier. As a result, the response of the effective compression ratio modifying mechanism 212 becomes faster such that the operating angle of the effective compression ratio modifying mechanism 212 begins to change from a time t1, as shown by the solid line in FIG. 25A.

After determining the target cranking torque T_MSt in this manner, the HCM 610 initiates cranking of the internal combustion engine 601 at the time t0. When the effective compression ratio of the internal combustion engine 601 reaches the effective compression ratio for normal operations at a time t2 after the engine rotation speed NE increases beyond the resonance rotation speed region, fuel supply to the fuel injector 207 begins, and as a result, combustion begins.

Hence, according to this embodiment, the required combustion start time from the start of engine start-up to the point at which combustion becomes possible is estimated in the manner described above, and when the required combustion start time rises above the predetermined time, the rate of increase in the engine rotation speed NE is corrected upward through cranking. In so doing, the time required from the beginning of cranking of the internal combustion engine 601 to the start of combustion in the engine can be shortened.

Also according to this embodiment, the required combustion start time of the internal combustion engine 601 is shortened, and therefore the internal combustion engine 601 can be started quickly, regardless of environmental variation. Thus, a delay in the acceleration of the vehicle from standstill can be prevented.

Further, the cranking torque limit TT_Mhigh is calculated in accordance with the SOC of the battery 603, and the corrected cranking torque TT_MSt is limited by the cranking torque limit TT_Mhigh. Hence, a reduction in performance due to overdischarge of the battery 603, shock accompanying the generation of excessive torque, and damage to the motor/generator 602 caused by an excessive electric load can be prevented.

The contents of Tokugan 2006-104497, with a filing date of Apr. 5, 2006 in Japan, are hereby incorporated by reference.

Although the invention has been described above with reference to certain embodiments of the invention, the invention is not limited to the embodiments described above. Modifications and variations of the embodiments described above will occur to those skilled in the art, within the scope of the claims.

Figure 26:
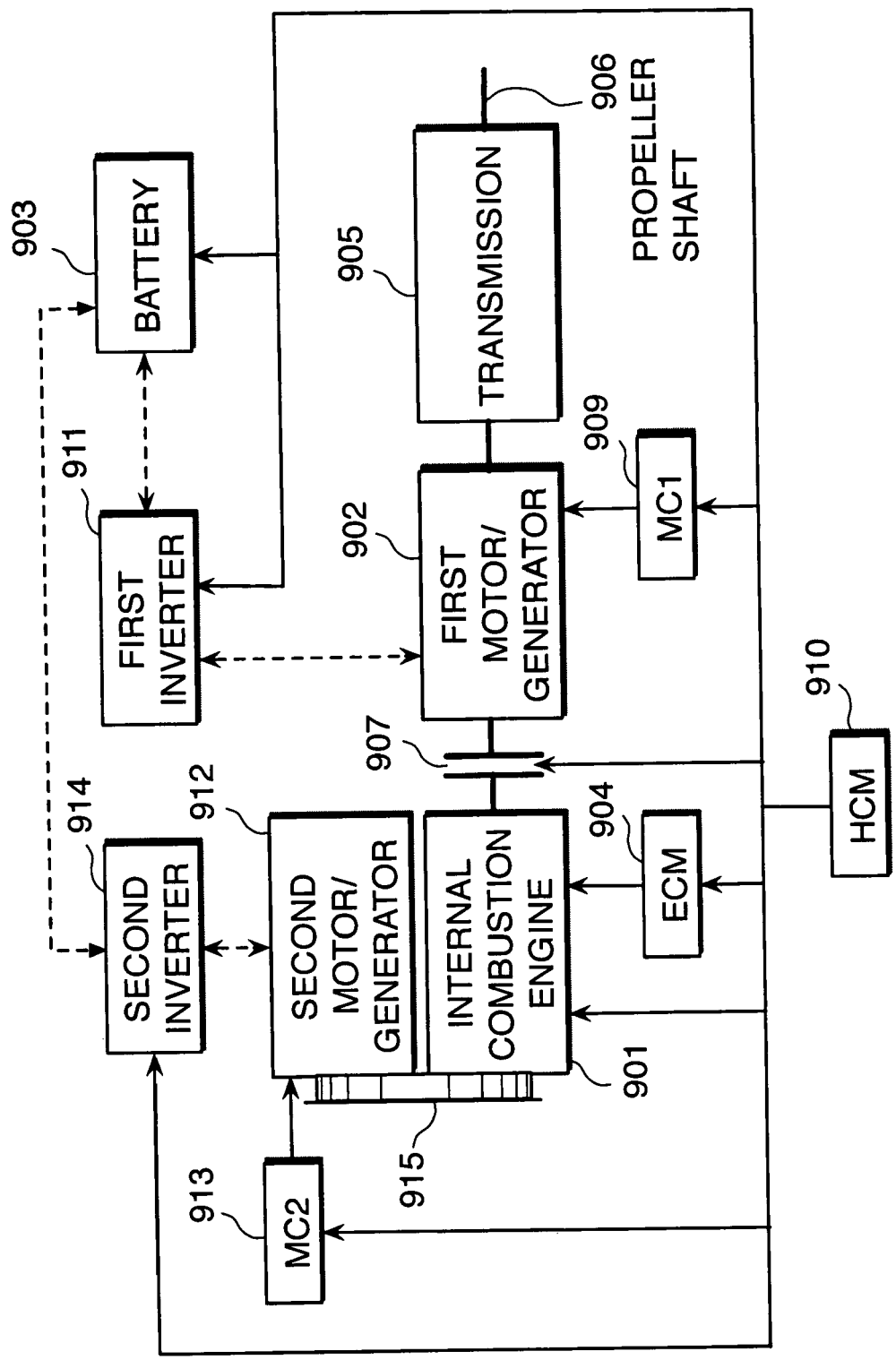
FIG. 26 is a schematic diagram of a hybrid drive electric vehicle to which this invention may be applied.

For example, this invention may be applied to a hybrid drive electric vehicle shown in FIG. 26. This hybrid drive electric vehicle comprises a hybrid drive system constituted by an internal combustion engine 901, a first motor/generator 902, and a second motor/generator 912.

The hybrid drive system comprises a power train constituted by the internal combustion engine 901, the first motor/generator 902, a transmission 905, a propeller shaft 906, a clutch 907, and the second motor/generator 912.

The internal combustion engine 901 is constituted identically to the internal combustion engine 101 of the first embodiment.

The first motor/generator 902 is connected to the internal combustion engine 901 via the clutch 907. The transmission 905 is connected to the first motor 902, and the propeller shaft 906 is connected to the transmission 905.

Furthermore, the internal combustion engine 901 is connected to the second motor/generator 912 by a belt 915.

The internal combustion engine 901, first motor/generator 902, and second motor/generator 912 are controlled by an ECM 904, a first MC 909, and a second MC 913, respectively. The ECM 904, first MC 909, second MC 913, and clutch 907 are controlled by an HCM 910.

The first motor/generator 902 functions mainly as an electric motor for driving the propeller shaft 906 via the transmission 905 and a regenerative braking generator for performing power generation using the rotational energy of the propeller shaft 906.

The second motor/generator 912 functions mainly as an electric motor for starting the internal combustion engine 901 and a generator for performing power generation using the rotational energy of the internal combustion engine 901.

The first motor/generator 902 is connected to a battery 903 via a first inverter 911. The second motor/generator 912 is connected to the battery 903 via a second inverter 914.

When the first motor/generator 902 functions as a generator, the first inverter 911 converts alternating current power generated by the first motor/generator 902 into direct current power and charges the battery 903 with this direct current power. When the first motor/generator 902 functions as an electric motor, the direct current power of the battery 903 is converted into alternating current power in accordance with a signal from the first MC 909, and supplied thus to the first motor/generator 902.

When the second motor/generator 912 functions as a generator, the second inverter 914 converts alternating current power generated by the second motor/generator 912 into direct current power and charges the battery 903 with this direct current power. When the second motor/generator 912 functions as an electric motor, the direct current power of the battery 903 is converted into alternating current power in accordance with a signal from the second MC 913, and supplied thus to the second motor/generator 912.

This invention may also be applied to this type of hybrid drive electric vehicle when the internal combustion engine 901 is started through cranking performed by the second motor/generator 912. This invention may be applied to any internal combustion engine that is started through cranking performed by an electric motor and in which the effective compression ratio is increased when the rotation speed increases beyond the resonance rotation speed region.

Further, in the embodiments described above, a diesel engine is used as the internal combustion engine, but this invention may also be applied to a gasoline engine.

The embodiments of this invention in which an exclusive property or privilege is claimed are defined as follows:

What is claimed is:

1. A start-up control device for an internal combustion engine, comprising:
   a device which supplies a fuel to the internal combustion engine;
   a starter motor which cranks the internal combustion engine;
   a sensor which detects an engine rotation speed of the internal combustion engine;
   a sensor which detects an operating parameter other than the engine rotation speed of the internal combustion engine;
   an effective compression ratio modifying mechanism which alters an effective compression ratio of the internal combustion engine from an effective compression ratio for a start-up operation to a larger effective compression ratio for a normal operation when the engine rotation speed increases beyond a resonance rotation speed region during cranking; and
   a programmable controller programmed to:
      determine whether or not the internal combustion engine has reached a combustion possible state on the basis of the engine rotation speed during cranking and the operating parameter other than the engine rotation speed; and
      inhibit fuel supply by the fuel supply device when the internal combustion engine has not reached the combustion possible state, even when the engine rotation speed has increased beyond the resonance rotation speed region.

2. The start-up control device as defined in claim 1, wherein the operating parameter is a quantity of state relating to combustion in the internal combustion engine, and the controller is further programmed to determine whether or not the internal combustion engine has reached the combustion possible state on the basis of the engine rotation speed and the quantity of state relating to combustion.

3. The start-up control device as defined in claim 2, wherein the quantity of state relating to combustion in the internal combustion engine includes at least one of an atmospheric pressure, an intake air temperature of the internal combustion engine, a cooling water temperature of the internal combustion engine, an effective compression ratio of the internal combustion engine, and a fuel pressure of the fuel supply device.

4. The start-up control device as defined in claim 2, wherein the quantity of state relating to combustion in the internal combustion engine includes a first quantity of state and a second quantity of state which is different to the first quantity of state, and the controller is further programmed to determine whether or not the internal combustion engine has reached the combustion possible state by performing a primary determination based on the first quantity of state and a secondary determination based on the second quantity of state, and inhibit fuel supply by the fuel supply device when the internal combustion engine is determined not to have reached the combustion possible state in either the primary determination or the secondary determination, even when the engine rotation speed has increased beyond the resonance rotation speed region.

5. The start-up control device as defined in claim 1, wherein the controller is further programmed to estimate a required time from a point at which the internal combustion engine starts cranking to a point at which combustion becomes possible on the basis of the quantity of state relating to combustion in the internal combustion engine, and control an increase rate of a rotation speed of the starter motor on the basis of the required time.

6. The start-up control device as defined in claim 5, wherein the quantity of state relating to combustion in the internal combustion engine used by the controller to estimate the required time to the point at which combustion becomes possible includes at least one of the atmospheric pressure, the intake air temperature of the internal combustion engine, a lubricating oil temperature of the internal combustion engine, the cooling water temperature of the internal combustion engine, the effective compression ratio of the internal combustion engine, and the fuel pressure of the fuel supply device.

7. The start-up control device as defined in claim 5, wherein the quantity of state relating to combustion in the internal combustion engine used by the controller to estimate the required time to the point at which combustion becomes possible includes a third quantity of state and a fourth quantity of state which is different to the third quantity of state, and the controller is further programmed to calculate a basic value of the required time on the basis of the third quantity of state, and estimate the required time to the point at which combustion becomes possible by adding a correction based on the fourth quantity of state to the calculated basic value.

8. The start-up control device as defined in claim 5, wherein the controller is further programmed to increase the increase rate of the rotation speed of the starter motor to shorten the estimated required time to the point at which combustion becomes possible.

9. The start-up control device for an internal combustion engine as defined in claim 8, wherein the controller is further programmed to increase the increase rate of the rotation speed of the starter motor by increasing a cranking torque of the starter motor.

10. The start-up control device for an internal combustion engine as defined in claim 9, wherein the controller is further programmed to limit the increase in the cranking torque to a predetermined upper limit value.

11. The start-up control device for an internal combustion engine as defined in claim 10, further comprising a battery which supplies a power to the starter motor, wherein the controller is further programmed to set the predetermined upper limit value on the basis of a state of charge of the battery.

12. A start-up control device for an internal combustion engine, comprising:
    means for supplying a fuel to the internal combustion engine;
    a starter motor which cranks the internal combustion engine;
    means for detecting an engine rotation speed of the internal combustion engine;
    means for detecting an operating parameter other than the engine rotation speed of the internal combustion engine;
    means for altering an effective compression ratio of the internal combustion engine from an effective compression ratio for a start-up operation to a larger effective compression ratio for a normal operation when the engine rotation speed increases beyond a resonance rotation speed region during cranking;

means for determining whether or not the internal combustion engine has reached a combustion possible state on the basis of the engine rotation speed during cranking and the operating parameter other than the engine rotation speed; and means for inhibiting fuel supply by the fuel supplying means when the internal combustion engine has not reached the combustion possible state, even when the engine rotation speed has increased beyond the resonance rotation speed region.

13. A start-up control method for an internal combustion engine, the engine comprising a device which supplies a fuel to the internal combustion engine, a starter motor which cranks the internal combustion engine, a sensor which detects an engine rotation speed of the internal combustion engine, and an effective compression ratio modifying mechanism which alters an effective compression ratio of the internal combustion engine from an effective compression ratio for a start-up operation to a larger effective compression ratio for a normal operation when the engine rotation speed increases beyond a resonance rotation speed region during cranking, the method comprising:

detecting an operating parameter other than the engine rotation speed of the internal combustion engine;

determining whether or not the internal combustion engine has reached a combustion possible state on the basis of the engine rotation speed during cranking and the operating parameter other than the engine rotation speed; and inhibiting fuel supply by the fuel supply device when the internal combustion engine has not reached the combustion possible state, even when the engine rotation speed has increased beyond the resonance rotation speed region.

* * * * *